United States Patent
Kawakami

(10) Patent No.: US 11,598,873 B2
(45) Date of Patent: Mar. 7, 2023

(54) OPTICAL APPARATUS FOR SCANNING AN OBJECT WITH ILLUMINATION LIGHT FLUX TO DETECT REFLECTED LIGHT FLUX FROM THE OBJECT, AND ON-BOARD SYSTEM AND MOBILE APPARATUS INCLUDING THE SAME

(71) Applicant: CANON KABUSHIKI KAISHA, Tokyo (JP)

(72) Inventor: Tomoaki Kawakami, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 288 days.

(21) Appl. No.: 16/956,812

(22) PCT Filed: Jan. 7, 2019

(86) PCT No.: PCT/JP2019/000064
§ 371 (c)(1),
(2) Date: Jun. 22, 2020

(87) PCT Pub. No.: WO2019/138961
PCT Pub. Date: Jul. 18, 2019

(65) Prior Publication Data
US 2021/0373158 A1  Dec. 2, 2021

(30) Foreign Application Priority Data
Jan. 9, 2018 (JP) .............................. JP2018-001405

(51) Int. Cl.
*G02B 6/28* (2006.01)
*G02B 27/30* (2006.01)
(Continued)

(52) U.S. Cl.
CPC .............. *G01S 17/42* (2013.01); *G01C 3/04* (2013.01); *G01S 17/931* (2020.01);
(Continued)

(58) Field of Classification Search
CPC .................................................. G02B 6/2817
See application file for complete search history.

(56) References Cited

U.S. PATENT DOCUMENTS

| 5,048,967 A | 9/1991 | Suzuki |
| 5,170,218 A | 12/1992 | Keene |
| (Continued) | | |

FOREIGN PATENT DOCUMENTS

| CN | 101344592 A | 1/2009 |
| CN | 201607407 U | 10/2010 |
| (Continued) | | |

OTHER PUBLICATIONS

Office Action issued in Chinese Appln. No. 201980007878.9 dated Jun. 17, 2021. English translation provided.
(Continued)

*Primary Examiner* — Sung H Pak
(74) *Attorney, Agent, or Firm* — Rossi, Kimms & McDowell LLP

(57) ABSTRACT

Provided is a detecting apparatus including a light source emitting an illumination light flux, a light receiving element receiving a reflected light flux from an object, a deflection unit deflecting illumination light flux toward the object to scan the object and deflecting reflected light flux toward light receiving element, a splitting unit allowing illumination light flux from light source to proceed toward deflection unit and allowing reflected light flux from deflection unit to proceed toward light receiving element, and a first telescope increasing a diameter of illumination light flux deflected by deflection unit, and decreasing a diameter of reflected light flux from the object in which the deflection unit is arranged so that a light path of a principal ray of illumination light flux
(Continued)

at a center angle of view in a scanning range of deflection unit is prevented from coinciding with an optical axis of first telescope.

20 Claims, 21 Drawing Sheets

(51) Int. Cl.
  *G01S 17/42* (2006.01)
  *G01S 17/931* (2020.01)
  *G01C 3/04* (2006.01)
  *B60T 8/171* (2006.01)
  *G01S 17/89* (2020.01)

(52) U.S. Cl.
  CPC ........... *G02B 6/2817* (2013.01); *G02B 27/30* (2013.01); *B60T 8/171* (2013.01); *G01S 17/89* (2013.01)

(56) References Cited

U.S. PATENT DOCUMENTS

| | | | |
|---|---|---|---|
| 5,448,359 | A | 9/1995 | Schick |
| 5,923,468 | A | 7/1999 | Tsuda |
| 6,411,371 | B1 | 6/2002 | Hinderling |
| 2001/0048517 | A1 | 12/2001 | Shirai |
| 2007/0058230 | A1 | 3/2007 | Blug |
| 2009/0201486 | A1 | 8/2009 | Cramblitt |
| 2012/0035788 | A1 | 2/2012 | Trepagnier |
| 2017/0299721 | A1* | 10/2017 | Eichenholz ......... H01S 3/06733 |
| 2020/0363509 | A1* | 11/2020 | Sato ........................ G01S 17/42 |
| 2021/0373158 | A1 | 12/2021 | Kawakami |

FOREIGN PATENT DOCUMENTS

| | | |
|---|---|---|
| CN | 103278809 A | 9/2013 |
| EP | 0987564 A1 | 3/2000 |
| GB | 1584556 A | 2/1981 |
| JP | S4932654 A | 3/1974 |
| JP | S616782 U | 1/1986 |
| JP | S6410104 A | 1/1989 |
| JP | H0587823 A | 4/1993 |
| JP | H09152483 A | 6/1997 |
| JP | 2011214926 A | 10/2011 |
| JP | 2016102738 A | 6/2016 |
| JP | 2019120616 A | 7/2019 |

OTHER PUBLICATIONS

International Search Report issued in Intl. Appln. No. PCT/JP2019/000064 dated Apr. 9, 2019.
Written Opinion issued in Intl. Appln. No. PCT/JP2019/000064 dated Apr. 9, 2019.
PCT Collaborative Search and Examination Peer ISA Contribution for Intl. Appln. No. PCT/JP2019/000064 from China, Europe, Korea, and US.
Office Action issued in Japanese Appln. No. 2019-112623 dated Jan. 4, 2022.
Notification to Grant issued in Chinese Appln. No. 201980007878.9 dated Jan. 13, 2022.
Extended European search report issued in European Appln. No. 19739121.2 dated Sep. 10, 2021.

* cited by examiner

OPTICAL APPARATUS FOR SCANNING AN OBJECT WITH ILLUMINATION LIGHT FLUX TO DETECT REFLECTED LIGHT FLUX FROM THE OBJECT, AND ON-BOARD SYSTEM AND MOBILE APPARATUS INCLUDING THE SAME

TECHNICAL FIELD

The present invention relates to a detecting apparatus configured to detect an object by illuminating the object and receiving reflected light that is reflected by the object.

BACKGROUND ART

Light Detection and Ranging (LiDAR), in which the distance to an object is calculated from how long it takes to receive reflected light from the object after the object is illuminated, or from the phase of the detected reflected light, is known as a method of detecting an object and measuring the distance to the object.

In recent years, LiDAR is attracting attention as a method of measuring the distance to an object for, for example, automated driving of automobiles.

In automated driving of automobiles, an automobile is required to identify a vehicle, a person, a hazardous object, or the like as an object, and take an action suitable for the distance to the identified object, for example, following or avoiding the object.

In Patent Literature 1, there is disclosed a detecting apparatus in which an object is scanned with illumination light that has been emitted from a laser, passed through a splitting unit, and deflected with a scan mirror, and reflected light that is reflected by the object is deflected toward a light receiving unit via the scan mirror and the splitting unit to measure the position of the object and the distance to the object from the reflected light that is received at the light receiving unit.

CITATION LIST

Patent Literature

PTL 1: US Patent Application Publication No. 2009/0201486

SUMMARY OF INVENTION

Technical Problem

As the object is farther away, the intensity of the reflected light that enters the detecting apparatus from the object is lower, and the detecting apparatus is therefore required to receive as much of the reflected light as possible.

For that purpose, it is effective to increase the amount of light by arranging a telescope near the emission side of the detecting apparatus and varying the diameters of the fluxes of the illumination light and the reflected light. Unfortunately, this also increases the amount of unnecessary light generated by reflection and scattering inside the detecting apparatus.

It is therefore an object of the present invention to provide a detecting apparatus capable of suppressing reception of unnecessary light that is increased by a telescope.

Solution to Problem

A detecting apparatus according to the present invention includes a light source configured to emit an illumination light flux, a light receiving element configured to receive a reflected light flux from an object, a deflection unit configured to deflect the illumination light flux toward the object in order to scan the object and configured to deflect the reflected light flux toward the light receiving element, a splitting unit configured to allow the illumination light flux from the light source to proceed toward the deflection unit and configured to allow the reflected light flux from the deflection unit to proceed toward the light receiving element, and a first telescope configured to increase a diameter of the illumination light flux deflected by the deflection unit and configured to decrease a diameter of the reflected light flux from the object in which the deflection unit is arranged so that a light path of a principal ray of the illumination light flux at a center angle of view in a scanning range of the deflection unit is prevented from coinciding with an optical axis of the first telescope.

Advantageous Effects of Invention

According to the present invention, a detecting apparatus capable of suppressing the reception of unnecessary light that is increased by a telescope can be provided.

Further features of the present invention will become apparent from the following description of exemplary embodiments with reference to the attached drawings.

DESCRIPTION OF EMBODIMENTS

First Embodiment

Figure 1:
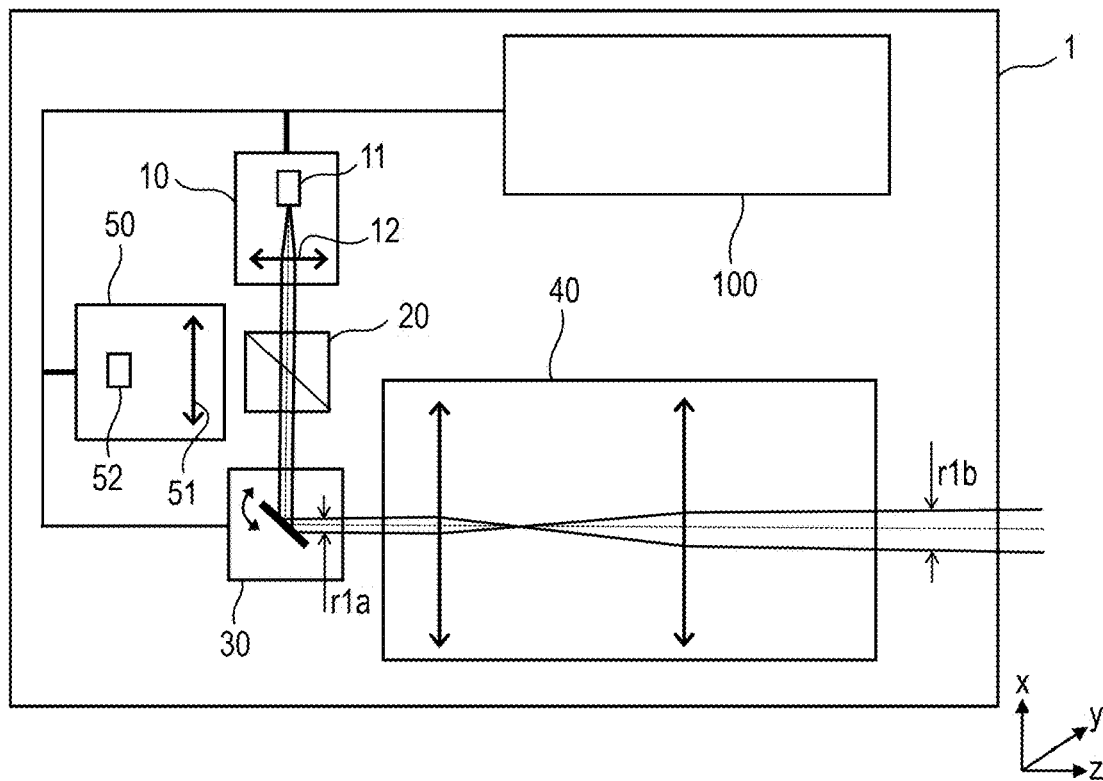
FIG. 1 is schematic sectional views of a detecting apparatus according to a first embodiment of the present invention.
Figure 1:
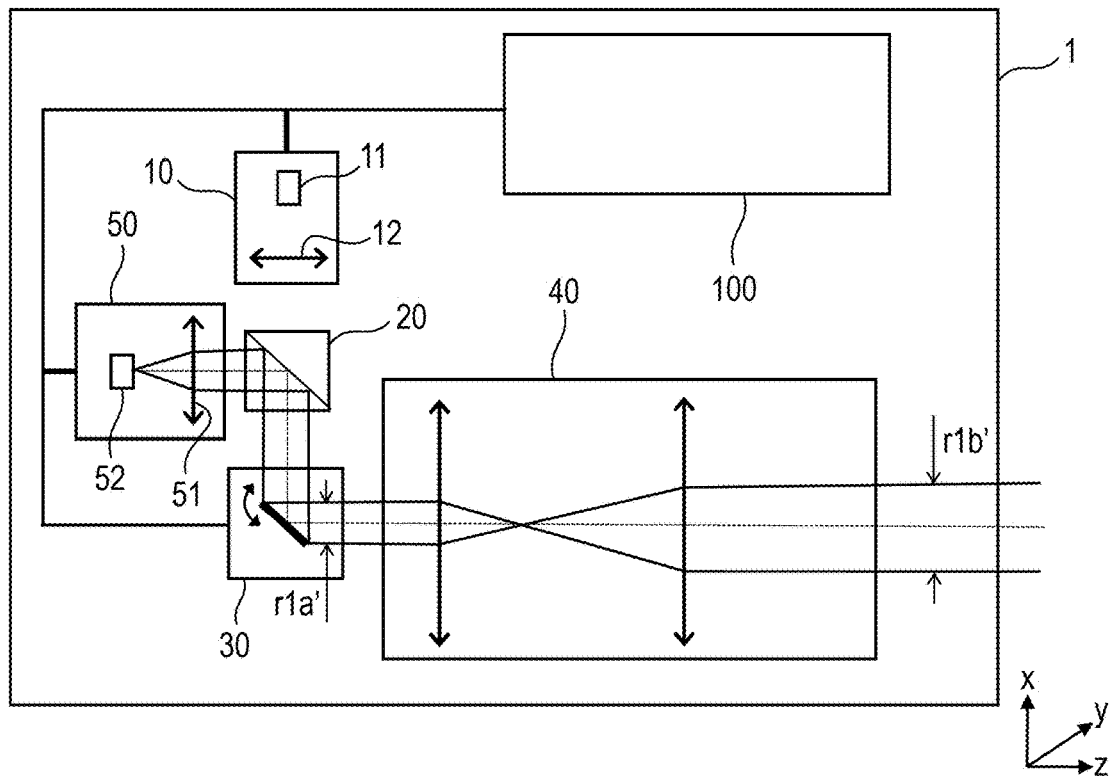

A detecting apparatus according to a first embodiment of the present invention is described in detail below with reference to the accompanying drawings. Some of the drawings referred to below may be drawn in scales different from the actual scale for easier understanding of the first embodiment.

The configuration of a LiDAR system includes an illumination system, which illuminates an object, and a reception system, which receives reflected light and scattered light from the object. LiDAR systems having this configuration are classified into a coaxial type, in which the illumination system and the reception system are oriented in completely the same direction, and a non-coaxial type, in which the illumination system and the reception system are configured separately from each other.

The detecting apparatus according to the first embodiment is suitable for a LiDAR system of the coaxial type, and the optical axis of the illumination system and the optical axis of the reception system coincide in a perforated mirror.

In automated driving in which an automobile is assumed to be driven at high speed, it is required to detect a farther object and to measure the distance to (that is, to range) the object.

Reflected light or scattered light returning from an object to the detecting apparatus is weaker as the object is farther away. For instance, the amount of reflected light that enters the detecting apparatus from an object 50 m away is smaller by about double digits than the amount of reflected light that enters the detecting apparatus from an object 5 m away.

Accordingly, one way to receive as much of reflected light as possible from a distant object is to increase the amount of illumination light exiting from the detecting apparatus by, for example, increasing the power of an illumination light source. However, the power of the illumination light source can only be increased to a limited level when the object is a person because safety to the human eyes is required to be taken into consideration. It is therefore required to devise a way to receive as much of reflected light as possible from a distant object without increasing the amount of illumination light.

The difficulty in measuring the size of an object also increases as the distance to the object increases.

In high-speed driving, in particular, it is required to detect the size of a distant object at an early point and use the detected size as a basis for determining the next course of action, and precision in the detection of the size of a distant object is accordingly important as well.

Reflected light and scattered light generated inside the detecting apparatus are unnecessary light, which lowers the precision of measurement, and it is preferred for a light receiving unit to receive as little unnecessary light as possible.

When the unnecessary light is generated a lot and is received along with reflected light that is received from an object, the detection performance of the detecting apparatus is lowered and an error of a calculated measured quantity increases. In addition, when the light receiving unit receives much unnecessary light that is generated at the time of emission of illumination light from the detecting apparatus, the resetting of electric charges in a light receiving element cannot be finished before reflected light from an object is received, with the result that the reflected light from the object cannot be distinguished from the unnecessary light. Consequently, the detection and ranging of the object cannot be conducted.

Patent Literature 1 contains no study on a configuration for suppressing the reception of the unnecessary light generated inside the detecting apparatus.

FIG. 1 is schematic sectional views of a detecting apparatus 1 according to the first embodiment. In FIG. 1, a light path for illumination and a light path for light reception are illustrated separately.

The detecting apparatus 1 according to the first embodiment includes a light source forming unit (light source unit) 10, an illumination light-received light splitting unit (splitting unit) 20, a driven mirror (deflection unit) 30, a telescope (first telescope) 40, a light receiving unit 50, and a control unit 100.

The light source forming unit 10 includes a light source 11 and a collimator 12. A divergent light flux (an illumination light flux) emitted from the light source 11 is converted by the collimator 12 into a parallel light flux having a light flux diameter r1a. The definition of a parallel light flux here includes not only a parallel light flux in a strict sense but also substantially parallel light fluxes, for example, a weak divergent light flux and a weak convergent light flux.

The illumination light-received light splitting unit 20 is constructed from, for example, a perforated mirror or a beam splitter, and has a function of separating an illumination light path and a received light path. Specifically, the illumination light-received light splitting unit 20 allows an illumination light flux from the light source forming unit 10 to proceed to the driven mirror 30 while allowing a light flux from the driven mirror 30 to proceed to the light receiving unit 50. The perforated mirror here is a mirror (reflective member) having an opening portion. A light flux incident on the perforated mirror is split into a light flux passing through the opening portion (the air) and a light flux reflected by a mirror surface (reflective surface). The opening portion of the perforated mirror may not be a hollow hole, and a transmissive member may be provided in the opening portion.

The driven mirror 30 has an effective diameter r1a' and is a biaxial driven mirror to be rotated about a Y-axis in FIG. 1, or an axis perpendicular to the Y-axis. The light flux diameter r1a of an illumination light flux is smaller than the effective diameter r1a' of the driven mirror 30.

The telescope 40 is an optical system that includes a plurality of optical elements (lenses) having a refractive power (a power) and that has no refractive power as the whole system. The telescope 40 is placed on the illumination side of the driven mirror 30, and the driven mirror 30 is positioned at an optical entrance pupil position of the telescope 40. An optical magnification β of the telescope 40 is greater than 1 (|β|>1) from the driven mirror 30 side to an exit pupil, and the diameter of the entrance pupil at which the driven mirror 30 is placed is larger than the effective diameter r1a' of the driven mirror 30.

The light receiving unit 50 includes a light collecting optical system (first imaging optical system) 51 and a light receiving element 52. A reflected light flux from an illuminated object is collected by the light collecting optical system 51 and is received by the light receiving element 52.

The control unit 100 controls the light source 11, which is provided in the light source forming unit 10, the driven mirror 30, and the light receiving element 52, which is provided in the light receiving unit 50. The control unit 100 drives the light source 11 and the driven mirror 30 at their respective predetermined drive voltages and drive frequencies, and uses a particular frequency to measure the waveform of received light received at the light receiving element 52.

A parallel light flux that has been emitted from the light source forming unit 10 and has the light flux diameter r1a passes through the illumination light-received light splitting unit 20, is deflected by the driven mirror 30, and turns into an illumination light flux having a light flux diameter r1b on an emission surface via the telescope 40 to illuminate an object outside the detecting apparatus 1.

Then, from the emission surface of the telescope 40, there re-enters a light flux which includes a reflected light flux reflected by the illuminated object and which has an effective diameter (i.e., the effective emission diameter of the telescope 40) r1b' The light flux that has re-entered travels through the telescope 40 and is deflected by the driven mirror 30 to turn into a light flux having the light flux diameter r1a' The deflected light flux is deflected in the illumination light-received light splitting unit 20 in a direction different from the direction of the illumination light flux to be received by the light receiving unit 50.

The control unit 100 measures a difference between a light reception time, which is acquired in the light receiving element 52, and a light emission time of the light source 11, or a difference between a phase of a received-light signal, which is acquired in the light receiving element 52, and a phase of an output signal from the light source 11. The difference is multiplied by the speed of light to determine the distance from the object.

While the illumination light-received light splitting unit 20 in the detecting apparatus 1 according to the first embodiment allows a light flux from the light source forming unit 10 to travel toward the driven mirror 30 and deflects a light flux from the driven mirror 30 toward the light receiving unit 50, the illumination light-received light splitting unit 20 is not limited thereto. The illumination light-received light splitting unit 20 may allow a light flux from the driven mirror 30 to travel toward the light receiving unit 50 while deflecting a light flux from the light source forming unit 10 toward the driven mirror 30.

As illustrated in FIG. 1, in the detecting apparatus 1 according to the first embodiment, the driven mirror 30 is driven at high speed and hence is required to have a small diameter in consideration of weight, with the result that the effective diameter of a light flux deflected by the driven mirror 30 is naturally small. Accordingly, the driven mirror 30 limits, with ease, the effective diameter of a light flux that includes a reflected light flux from an illuminated object.

The effective diameter r1b' of the light flux re-entering from the emission surface of the telescope 40 is expressed by Expression (1) below with the use of the effective diameter r1a' of the driven mirror 30 and the optical magnification β of the telescope 40.

[Math. 1]

$$r1b' = r1a' \times |\beta| \qquad (1)$$

As illustrated in FIG. 1, the effective diameter r1b' of the light flux is |β| (>1) times larger than the effective diameter r1a' of the driven mirror 30. The detecting apparatus 1 according to the first embodiment is accordingly capable of receiving more reflected and scattered light fluxes from an object than when the telescope 40 is not provided.

A deflection angle θ2 of a principal ray of an illumination light flux exiting from the telescope 40 is expressed by Expression (2) below with the use of a deflection angle θ1 of a principal ray of a parallel light flux deflected by the driven mirror 30 and the optical magnification β of the telescope 40.

[Math. 2]

$$\theta 2 = \frac{\theta 1}{|\beta|} \qquad (2)$$

As illustrated in FIG. 1, the deflection angle θ2 of the principal ray of the illumination light flux is smaller than the deflection angle θ1 of the principal ray of the parallel light flux deflected by the driven mirror 30 because the optical magnification β of the telescope 40 is greater than 1.

The angle of view is consequently narrow in the detecting apparatus 1 according to the first embodiment, but the detection interval is narrow as well, with the result that the detection resolution can be improved.

Figure 2A:
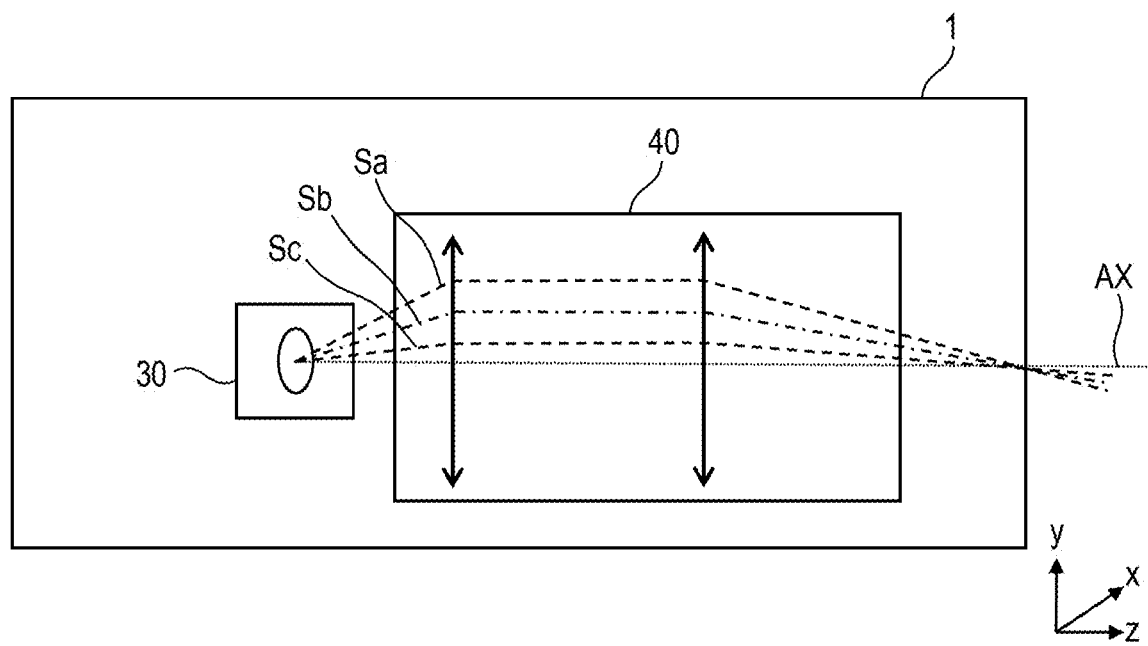
FIG. 2A is a partially enlarged view of the detecting apparatus according to the first embodiment.

In the detecting apparatus 1 according to the first embodiment, light paths of principal rays in an illumination light flux deflected by the driven mirror 30, that is, light paths observed when the driven mirror 30 is driven, are illustrated in FIG. 2A in Y-Z section.

FIG. 2A is a partially enlarged view of the detecting apparatus 1 according to the first embodiment. In FIG. 2A, there are also illustrated a principal ray Sa, which is included in the illumination light flux and which travels in an outermost light path outside the optical axis of the telescope 40 (the largest angle of view in the range of scanning angle of views), a principal ray Sb, which is included in the illumination light flux and which travels in a light path of a center angle of view in a range in which the driven mirror 30 can be driven (the range of scanning field angles), and a principal ray Sc, which is included in the illumination light flux and which travels in a light path closest to the optical axis of the telescope 40.

Figure 2B:
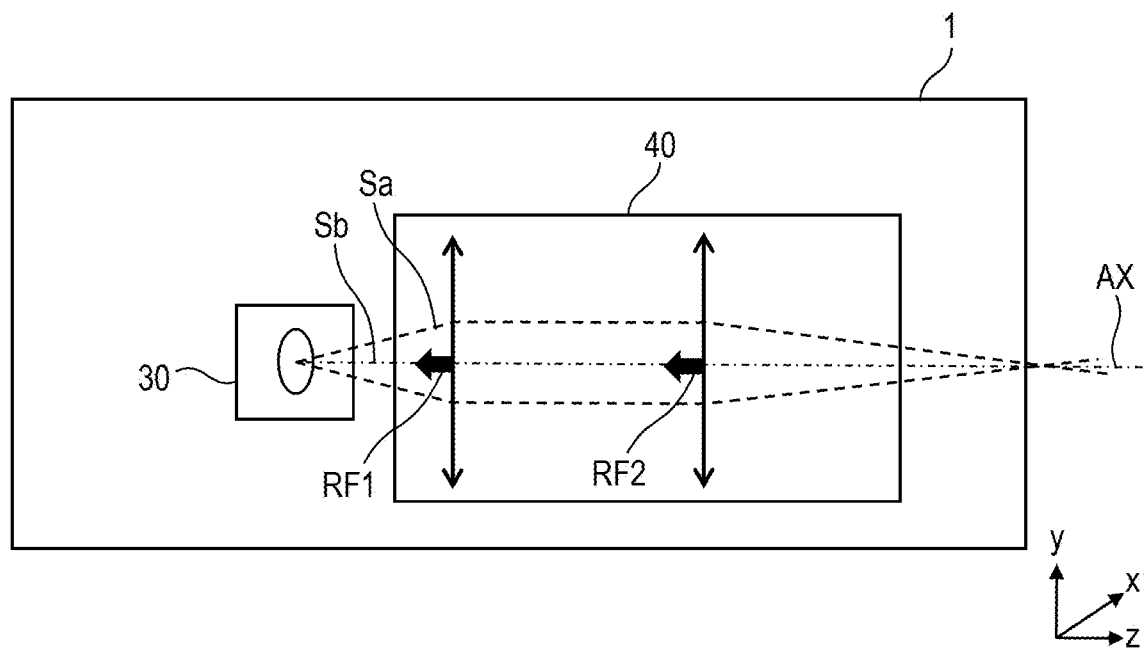
FIG. 2B is a partially enlarged view of a detecting apparatus of a comparative example.

FIG. 2B is a partially enlarged view of the detecting apparatus 1 in which the driven mirror 30 is arranged so that the light path (illumination light path) of the center angle of view coincides with an optical axis Ax of the telescope 40.

As illustrated in FIG. 2B, when the driven mirror 30 in the detecting apparatus 1 is arranged so that the light path of the principal ray Sb of the illumination light flux at the center angle of view in the range of scanning angle of views of the driven mirror 30 coincides with the optical axis Ax of the telescope 40, reflected light fluxes RF1 and RF2, which are light fluxes returning from the optical elements provided in the telescope 40, travel so as to overlap with the illumination light flux along the optical axis Ax and enter the light receiving unit 50. Further, also in the vicinity of the light path of the illumination light flux illustrated in FIG. 2B, reflected and scattered light fluxes from the optical elements provided in the telescope 40 more or less return and enter the light receiving unit 50. Therefore, the unnecessary light described above, such as the reflected light fluxes RF1 and RF2, is thus generated in a given range of angle of views as illustrated in FIG. 3A when the optical axis Ax of the telescope 40 and the light path of the center angle of view of the driven mirror 30 coincide as illustrated in FIG. 2B.

Figure 3A:
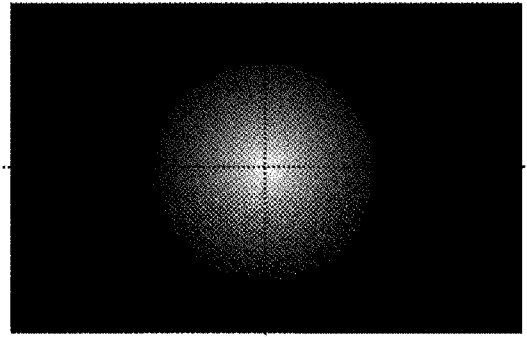
FIG. 3A is a diagram for illustrating how unnecessary light received in the detecting apparatus of the comparative example looks.
Figure 3B:
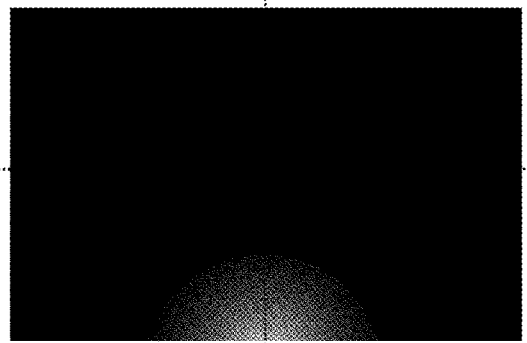
FIG. 3B is a diagram for illustrating how unnecessary light received in the detecting apparatus according to the first embodiment looks.

FIG. 3A and FIG. 3B are diagrams for illustrating the look of unnecessary light that is received on a light receiving surface 52D of the light receiving element 52 when the driven mirror 30 is driven two-dimensionally in the detecting apparatus 1. An intersection point at which two dotted-line axes in the drawings are orthogonal to each other represents a drive center angle of view of the driven mirror 30, the horizontal axis represents an angle of view observed when the driven mirror 30 is driven in a direction X, and the vertical axis represents an angle of view observed when the driven mirror 30 is driven in a direction Y.

In FIG. 3A and FIG. 3B, white portions indicate angle of views at which unnecessary light is generated, and black portions indicate angle of views at which unnecessary light is not generated.

As illustrated in FIG. 2A, on the other hand, when the driven mirror 30 in the detecting apparatus 1 according to the first embodiment is arranged so that the light path (illumination light path) of the principal ray Sb of the illumination light flux at the center angle of view in the range of scanning angle of views of the driven mirror 30 does not coincide with the optical axis Ax of the telescope 40, the illumination light flux does not travel along the optical axis Ax of the telescope 40.

Consequently, optical elements provided in the telescope 40 in the detecting apparatus 1 according to the first embodiment generates unnecessary light that is merely recognizable in a range of angle of views far off the center on the light receiving surface 52D of the light receiving element 52 as illustrated in FIG. 3B.

As described above, according to the detecting apparatus 1 of the first embodiment, much of reflected and scattered light fluxes from an illuminated object can be taken in and the detection interval can be made close by placing the driven mirror 30 at the position of the entrance pupil of the telescope 40 having the optical magnification β that is greater than 1. The detection resolution is improved as a result.

In the detecting apparatus 1, the scanning angle of the driven mirror 30 is set so that the light path of a principal ray of an illumination light flux at the center angle of view in the range of scanning angle of views of the driven mirror 30 does not coincide with the optical axis Ax of the telescope 40 (so as to prevent the driven mirror 30 from deflecting the illumination light flux in a direction that runs along the optical axis of the telescope 40, at the center angle of view in the range of scanning angle of views of the driven mirror 30). Specifically, the scanning angle of the driven mirror 30 is set so that a principal ray of the illumination light flux obliquely enters an object (illuminated surface) in one of sections containing the optical axis. The reception of unnecessary light at and around the center angle of view can be suppressed by this configuration.

In other words, the reception of unnecessary light can be suppressed by arranging the driven mirror 30 so that the center angle of view of the driven mirror 30 is an angle of view outside the optical axis of the telescope 40.

This gives the detecting apparatus 1 improved ranging performance with respect to a distant object and an improved detection resolution with respect to the size of a distant object.

Second Embodiment

Figure 4:
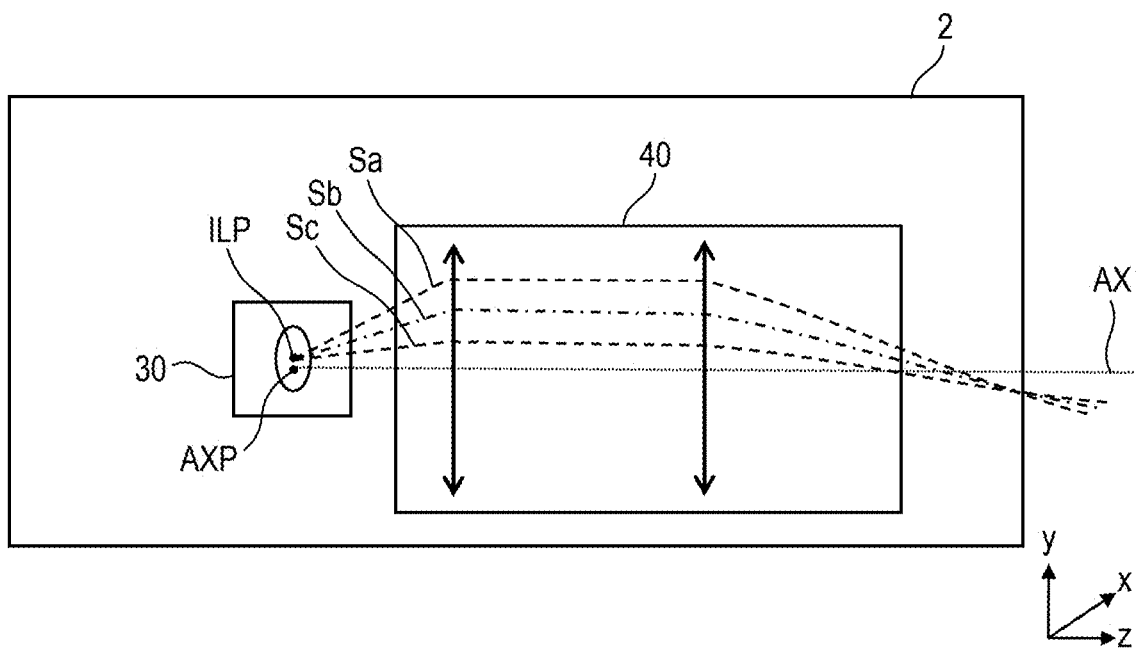
FIG. 4 is a partially enlarged view of the detecting apparatus according to the second embodiment.

FIG. 4 is a partially enlarged view of a detecting apparatus 2 according to a second embodiment of the present invention. In FIG. 4, there are also illustrated a principal ray Sa, which is included in an illumination light flux and which travels in an outermost light path outside the optical axis of the telescope 40 (the largest angle of view in the range of scanning angle of views), a principal ray Sb, which is included in the illumination light flux and which travels in a light path of a center angle of view in a range in which the driven mirror 30 can be driven (the range of scanning angle of views), and a principal ray Sc, which is included in the illumination light flux and which travels in a light path closest to the optical axis of the telescope 40.

The detecting apparatus 2 according to the second embodiment has a configuration similar to that of the detecting apparatus 1 according to the first embodiment, and a member in the detecting apparatus 2 that is the same as the one in the detecting apparatus 1 is denoted by the same reference number in order to omit a description on the member.

The telescope 40 is arranged so as to be decentered in the detecting apparatus 2 according to the second embodiment. Specifically, as illustrated in FIG. 4, when an intersection point between the optical axis Ax of the telescope 40 and the driven mirror 30 is given as AXP, and an incidence point on a mirror surface (a deflection surface, a scan surface) of the driven mirror 30 at which an illumination light flux enters is given as ILP, the telescope 40 is decentered so that AXP and ILP do not coincide.

In other words, the telescope 40 is arranged so that the optical axis Ax of the telescope 40 does not intersect with the incidence point ILP of an illumination light flux on the mirror surface of the driven mirror 30. That is, the light path of a principal ray of an illumination light flux at the center angle of view in the range of scanning angle of views of the driven mirror 30 does not coincide with the optical axis Ax of the telescope 40.

Figure 5A:
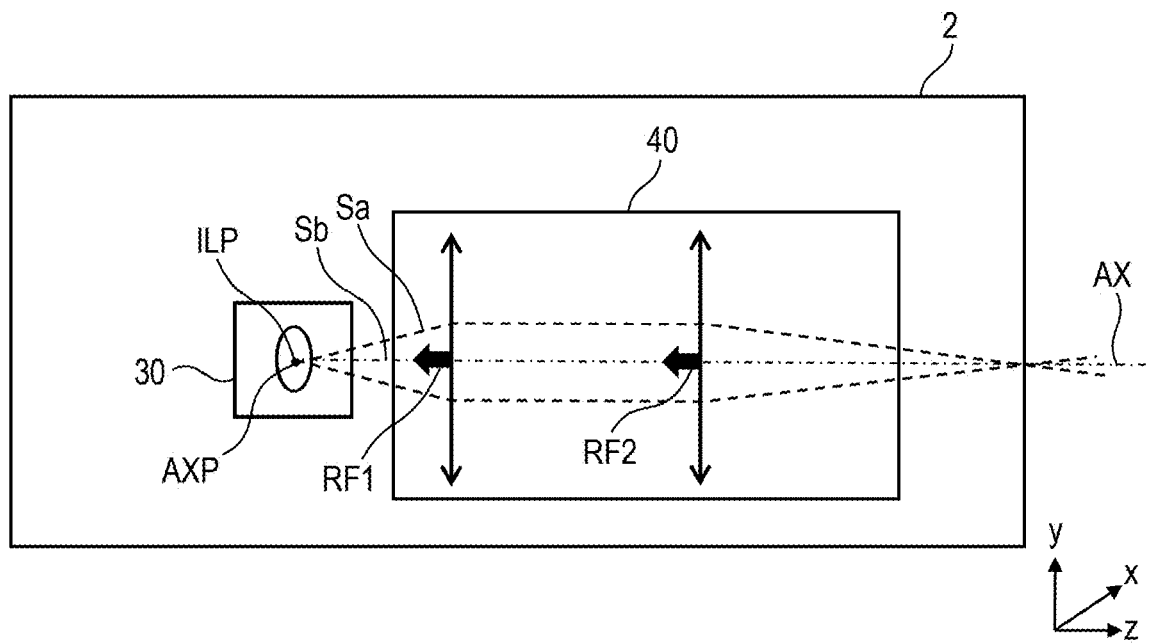
FIG. 5A is a partially enlarged view of a detecting apparatus of a comparative example.
Figure 5B:
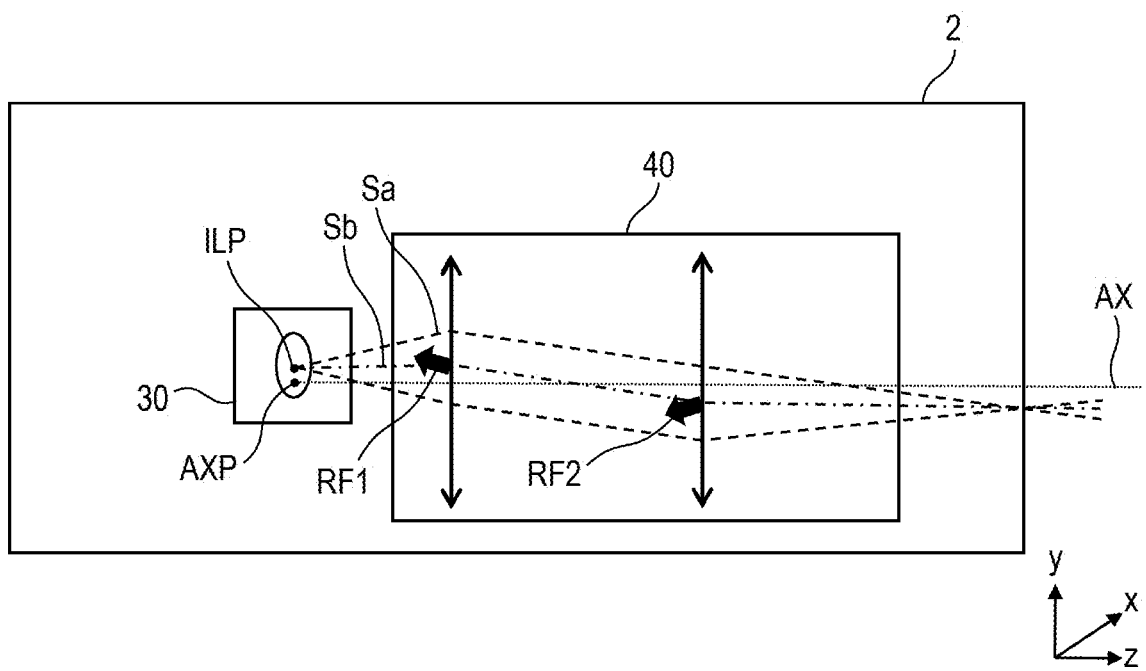
FIG. 5B is a partially enlarged view of the detecting apparatus according to the second embodiment.

FIG. 5A is a partially enlarged view of a detecting apparatus of a comparative example in which the driven mirror 30 is arranged so that the light path of a principal ray of an illumination light flux at the center angle of view in the range of scanning angle of views of the driven mirror 30 coincides with the optical axis Ax of the telescope 40. FIG. 5B is a partially enlarged view of the detecting apparatus 2 according to the second embodiment in which the driven mirror 30 is arranged so that the light path of a principal ray of an illumination light flux at the center angle of view in the range of scanning angle of views of the driven mirror 30 does not coincide with the optical axis Ax of the telescope 40.

Figure 6A:
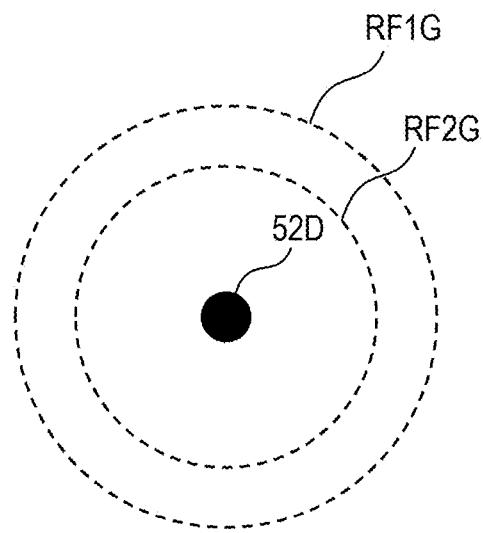
FIG. 6A is a diagram for illustrating a reflected light area that is formed on a light receiving surface of a light receiving element in a detecting apparatus of a comparative example.
Figure 6B:
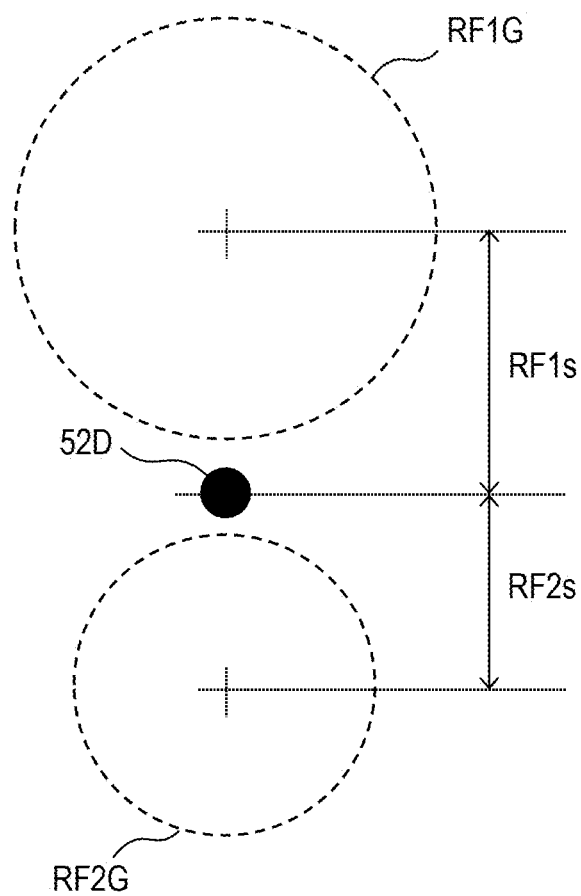
FIG. 6B is a diagram for illustrating a reflected light area that is formed on a light receiving surface of a light receiving element in the detecting apparatus according to the second embodiment.

FIG. 6A is a diagram for illustrating a positional relation that is observed in the case of FIG. 5A between the light receiving surface 52D of the light receiving element 52 and reflected light areas RF1G and RF2G, which are formed in a section parallel to the light receiving surface 52D by the reflected light fluxes RF1 and RF2 from the telescope 40. FIG. 6B is a diagram for illustrating a positional relation that is observed in the case of FIG. 5B between the light receiving surface 52D of the light receiving element 52 and the reflected light areas RF and RF2G formed in a section parallel to the light receiving surface 52D by the reflected light fluxes RF1 and RF2 from the telescope 40.

As illustrated in FIG. 5A, when the light path of the principal ray Sb of the illumination light flux at the center angle of view in the range of scanning angle of views of the driven mirror 30 coincides with the optical axis Ax of the telescope 40, the reflected light fluxes RF1 and RF2 from the optical elements provided in the telescope 40 are each reflected along the optical axis Ax in the same direction as the reflection direction of the other reflected light.

This makes the reflected light fluxes RF1 and RF2 arriving from the telescope 40 blurred on the light receiving surface of the light receiving element 52 of the light receiving unit 50.

The reflected light areas RF1G and RF2G are formed so as to overlap with the light receiving surface 52D in a section parallel to the light receiving surface 52D as illustrated in FIG. 6A when the light path of the principal ray Sb of the illumination light flux at the center angle of view in the range of scanning angle of views of the driven mirror 30 coincides with the optical axis Ax of the telescope 40 as described above.

On the other hand, as illustrated in FIG. 5B, when the light path of the principal ray Sb of the illumination light flux at the center angle of view in the range of scanning angle views of the driven mirror 30 does not coincide with the optical axis Ax of the telescope 40, the reflection angles of the reflected light fluxes RF1 and RF2 from optical elements provided in the telescope 40 are dispersed.

This spaces the reflected light areas RF1G and RF2G from the light receiving surface 52D as illustrated in FIG. 6B.

Figure 3C:
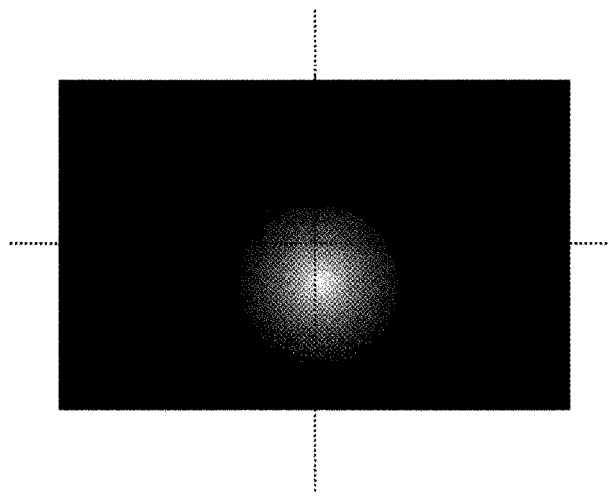
FIG. 3C is a diagram for illustrating how unnecessary light received in a detecting apparatus according to a second embodiment of the present invention looks.

Consequently, as illustrated in FIG. 3C, the range of angle of views of unnecessary light that is received on the light receiving surface 52D of the light receiving element 52 from the optical elements provided in the telescope 40 can be made narrower than in FIG. 3A.

When optical elements provided in the telescope 40 have a reflection surface that contributes significantly to the generation of unnecessary light, intense unnecessary light is generated at an angle of view depending on the direction of a reflected light flux from the reflection surface. In other words, the angle of view at which intense unnecessary light is generated varies depending on the direction in which the telescope 40 is decentered. Accordingly, the range of angle of views of unnecessary light can be narrowed and can be moved to a point far off the center of the light receiving surface 52D of the light receiving element 52 as illustrated in FIG. 3D by setting the angle of the driven mirror 30 as in the detecting apparatus 1 according to the first embodiment in addition to decentering the telescope 40 so that the light path of a principal ray Sb of an illumination light flux at the center angle of view in the range of scanning angle of views of the driven mirror 30 does not coincide with the optical axis Ax of the telescope 40.

Figure 3D:
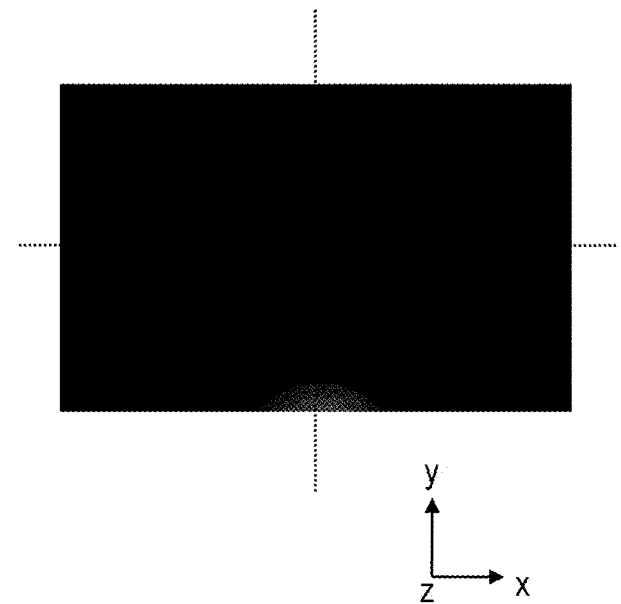
FIG. 3D is a diagram for illustrating how unnecessary light received in a detecting apparatus according to a modification example of the second embodiment looks.

While unnecessary light is allowed to remain in FIG. 3D for the sake of description, it is preferred to set the angle of the driven mirror 30 and the position of decentering of the telescope 40 so that unnecessary light is completely removed from the light receiving surface 52D of the light receiving element 52.

As illustrated in FIG. 6B, when the amounts of the spacing of the reflected light areas RF and RF2G from the light receiving surface 52D are given as RF1s and RF2s, respectively, the amounts of the spacing and the directions of the spacing depend on the arrangement of the optical elements provided in the telescope 40 and on the direction of decentering of the telescope 40. It is therefore preferred to take into consideration an angle of view at which unnecessary light is generated and an angle of view at which the detecting apparatus 2 is used in determining the direction in which the telescope 40 is decentered.

As described above, according to the detecting apparatus 2 of the second embodiment, the generation of unnecessary light in the apparatus can be suppressed in a wider range of angle of views than in the detecting apparatus 1 according to the first embodiment, while taking in much of reflected and scattered light fluxes from a distant object illuminated by the apparatus.

On-board LiDAR systems are generally demanded to be wider in angle of views horizontal to the ground than in angle of views perpendicular to the ground. It is therefore preferred in the detecting apparatus 2 according to the second embodiment to set the direction X as an angle of view horizontal to the ground, set the direction Y as an angle of view perpendicular to the ground, and decenter the telescope in the direction Y.

Third Embodiment

Figure 7:
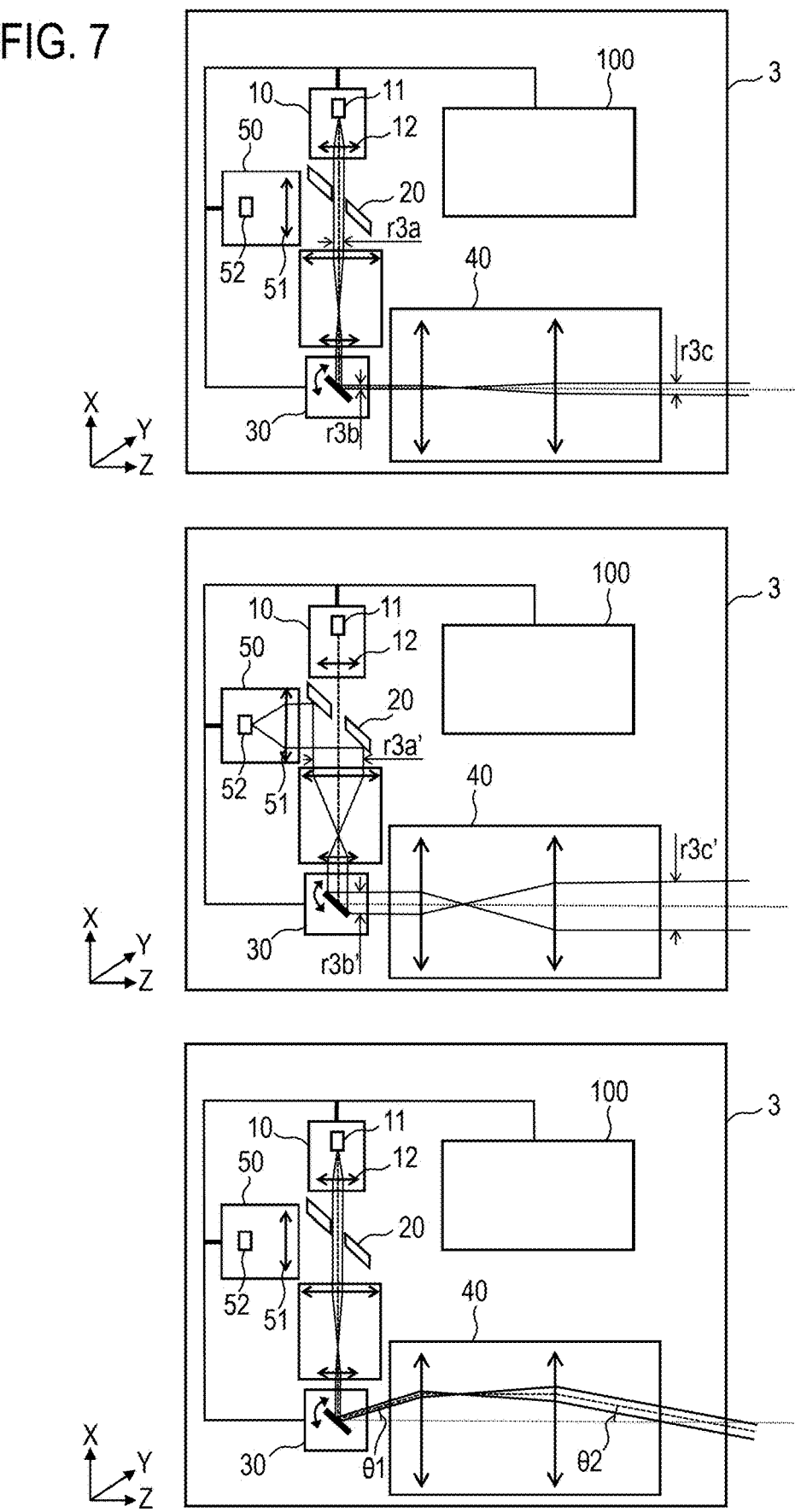
FIG. 7 is schematic sectional views of a detecting apparatus according to a third embodiment of the present invention.

FIG. 7 is schematic sectional views of a detecting apparatus 3 according to a third embodiment of the present invention. In FIG. 7, a light path for illumination and a light path for light reception are illustrated separately.

The detecting apparatus 3 according to the third embodiment has a configuration similar to that of the detecting apparatus 1 according to the first embodiment, except that a variable power optical system 60 is provided, and a member in the detecting apparatus 3 that is the same as the one in the detecting apparatus 1 is denoted by the same reference number in order to omit a description on the member.

The variable power optical system (a second telescope) 60 is placed between the light source forming unit 10 and the driven mirror 30. The variable power optical system 60 in the third embodiment has the optical magnification β ($|β|<1$), and converts a parallel light flux that has passed through the perforated mirror 20 and has a light flux diameter r3a into a parallel light flux having a light flux diameter r3b, which is smaller than r3a. Specifically, the light flux diameter r3b is expressed by Expression (3) below with the use of the effective diameter r3a and the optical magnification β of the variable power optical system 60.

[Math. 3]

$$r3b = r3a \times |\beta| \quad (3)$$

The light flux diameter r3b of an illumination light flux that has passed the variable power optical system 60 is smaller than the effective diameter of the driven mirror 30.

The parallel light flux that has been emitted from the light source forming unit 10 and has the light flux diameter r3a passes (is transmitted) through the perforated mirror 20, and is converted by the variable power optical system 60 into an illumination light flux having the light flux diameter r3b. The illumination light flux is deflected by the driven mirror 30, and turns into an illumination light flux having a light flux diameter r3c on the emission surface via the telescope 40 to illuminate an object outside the detecting apparatus 3. Then, from the emission surface of the telescope 40, there re-enters a light flux which includes a reflected light flux reflected by the illuminated object and which has an effective diameter (i.e., the effective emission diameter of the telescope 40) r3c'. The light flux that has re-entered travels through the telescope 40 and is deflected by the driven mirror 30 to turn into a light flux having a light flux diameter r3b'. The deflected light flux is converted by the variable power optical system 60 into a received light flux having a light flux diameter r3a', which is larger than r3b'. The received light flux is then deflected (reflected) at the perforated mirror 20 in a direction different from the direction of the illumination light flux to be received by the light receiving unit 50.

The control unit 100 then measures a difference between a light reception time, which is acquired in the light receiving element 52, and a light emission time of the light source 11, or a difference between the phase of a received-light signal, which is acquired in the light receiving element 52, and the phase of an output signal from the light source 11. The difference is multiplied by the speed of light to determine the distance from the object.

As illustrated in FIG. 7, in the detecting apparatus 3 according to the third embodiment, the driven mirror 30 is driven at high speed and hence is required to have a small diameter in consideration of weight, with the result that the effective diameter of a light flux deflected by the driven mirror 30 is naturally small. Accordingly, the driven mirror 30 limits, with ease, the effective diameter of a light flux that includes a reflected light flux from an illuminated object.

Accordingly, the effective diameter r3b' of the light flux can be considered as equal to the effective diameter of the driven mirror 30.

The light flux diameter r3a' of the received light received by the receiving unit 50 is expressed by Expression (4) below with the use of the effective diameter r3b' of the light flux and the optical magnification β of the variable power optical system 60.

[Math. 4]

$$r3a' = \frac{r3b'}{|\beta|} \quad (4)$$

When the diameter of the opening formed in the perforated mirror 20 is given as H, the proportion of the amount of light that cannot be received as a reception signal by the light receiving unit 50 due to the perforated mirror 20, that is, a loss ratio R at which a portion of the received light flux is lost due to the perforated mirror 20, is expressed by Expression (5) below.

[Math. 5]

$$R = \frac{H^2}{\left(\frac{r3b'}{|\beta|}\right)^2} \quad (5)$$

When the variable power optical system 60 is not provided, the light flux diameter r3a' of the received light flux received by the light receiving unit 50 is equal to the effective diameter of the driven mirror 30, namely, the effective diameter r3b' of the light flux.

When the light flux diameter of the parallel light flux emitted from the light source forming unit 10 is r3a, and the light flux diameter of the parallel light flux that has passed through the perforated mirror 20 and is entering the driven mirror 30 is r3b, r3a equals r3b.

In this case, the proportion of the amount of light that cannot be received as a reception signal by the light receiving unit 50 due to the perforated mirror 20, that is, a loss ratio R' at which a portion of the received light flux is lost due to the perforated mirror 20, is expressed by Expression (6) below.

[Math. 6]

$$R' = \frac{H^2}{r3b'^2} \quad (6)$$

Therefore, from Expression (5) and Expression (6), the ratio of the loss ratios R and R' is expressed by Expression (7) below.

[Math. 7]

$$\frac{R}{R'} = \frac{\left(\frac{r3b'}{|\beta|}\right)^2}{\frac{H^2}{r3b'^2}} = \beta^2 \quad (7)$$

The inclusion of the variable power optical system 60 thus enables the detecting apparatus 3 according to the third embodiment to reduce the proportion of the amount of light that cannot be received as a reception signal by the light receiving unit 50 due to the perforated mirror 20, that is, the loss ratio of received light due to the perforated mirror 20, by $\beta^2$ times.

The effective diameter r3c' of the light flux that re-enters from the emission surface of the telescope 40 is expressed by Expression (8) below with the use of the effective diameter r3b' of the driven mirror 30 and an optical magnification β' ($|\beta'|>1$) of the telescope 40.

[Math. 8]

$$r3c' = r3b' \times |\beta'| \quad (8)$$

As illustrated in FIG. 7, the effective diameter r3c' of the light flux is $|\beta'|$ (>1) times larger than the effective diameter r3b' of the driven mirror 30.

A received light amount F' of the light receiving unit 50 in the detecting apparatus 3 according to the third embodiment is compared to a received light amount F of the light receiving unit 50 in the detecting apparatus 3 as a comparative example in which none of the variable power optical system 60 and the telescope 40 is included.

The received light amount F of the light receiving unit 50 in the detecting apparatus 3 as a comparative example is obtained by Expression (9) below from Expression (6) when the light amount of a light flux having the effective diameter r3b' is 1 at the time of re-entrance to the driven mirror 30.

[Math. 9]

$$F = 1 - \frac{H^2}{r3b'^2} \quad (9)$$

The received light amount F' of the light receiving unit 50 in the detecting apparatus 3 according to the third embodiment is obtained by Expression (10) below from Expression (5) and Expression (8) when the light amount of the light flux having the effective diameter r3b' is similarly 1 at the time of re-entrance to the driven mirror 30.

[Math. 10]

$$F' = \left[1 - \frac{H^2}{\left(\frac{r3b'}{|\beta|}\right)^2}\right] \times \beta'^2 \quad (10)$$

A received light amount ratio F'/F is expressed by Expression (11) below when r3b', β, and β' are set to 2H, 0.2, and 3, respectively.

[Math. 11]

$$\frac{F'}{F} = \frac{\left[1 - \frac{H^2}{\left(\frac{r3b'}{|\beta|}\right)^2}\right] \times \beta'^2}{1 - \frac{H^2}{r3b'^2}} = \quad (11)$$

$$\frac{\left[1 - \frac{H^2}{\left(\frac{2H}{0.2}\right)^2}\right] \times 3^2}{1 - \frac{H^2}{4H^2}} = \left[1 - \frac{0.04}{4}\right] \times 3^2 \times \frac{4}{3} \cong 12$$

Thus, the detecting apparatus 3 according to the third embodiment is capable of receiving light at the light receiving unit 50 in a light amount approximately twelve times larger than the received light amount in the detecting apparatus 3 as a comparative example.

The deflection angle θ2 of a principal ray of an illumination light flux exiting from the telescope 40 is expressed by Expression (12) below with the use of the deflection angle θ1 of a principal ray of a parallel light flux deflected by the driven mirror 30 and the optical magnification β' of the telescope 40.

[Math. 12]

$$\theta 2 = \frac{\theta 1}{|\beta'|} \quad (12)$$

As illustrated in FIG. 7, the deflection angle θ2 of the principal ray of the illumination light flux is smaller than the deflection angle θ1 of the principal ray of the parallel light flux deflected by the driven mirror 30 because the optical magnification β' of the telescope 40 is larger than 1.

Consequently, the angle of view is narrow in the detecting apparatus 3 according to the third embodiment, but the detection interval is narrow as well, with the result that the detection resolution can be improved.

In the detection of reflected light from a distant object, the detecting apparatus has more difficulty in detecting the size of the object as the distance between the detecting apparatus and the object is longer.

In automated driving in which an automobile is assumed to be driven at high speed, in particular, it is required to detect the size of a distant object at an early point and use the detected size as a basis for determining the next course of action, and precision in the detection of the size of a distant object is accordingly important.

The detecting apparatus 3 according to the third embodiment has a new effect in that not only an improvement in received light amount but also an improvement in detection resolution is accomplished.

In the detecting apparatus 3 according to the third embodiment, the variable power optical system 60, which is placed between the perforated mirror 20 and the driven mirror 30, may include a perforated mirror. In that case, the focal length of the light collecting optical system 51 of the light receiving unit 50 is required to be modified, but the concept described above applies as it is to the opening and the light reception efficiency.

In the detecting apparatus 3 according to the third embodiment, the collimator 12 converts a divergent light flux emitted from the light source 11 in the light source forming unit 10 into a parallel light flux having the light flux diameter r3a, which is smaller than the opening diameter H of the perforated mirror 20. The detecting apparatus 3, however, is not limited thereto, and a stop may be provided between the light source forming unit 10 and the perforated mirror 20.

In the detecting apparatus 3 according to the third embodiment, the light source forming unit 10, which is made up solely of the light source 11 and the collimator 12, is not limited thereto. When the angle of divergence from the light source 11 is asymmetric, a cylindrical lens or the like may be provided in the light source forming unit 10 to shape a divergent light flux emitted from the light source 11, and subsequently adjust the light flux diameter with the provided stop.

What is important here is to keep the light amount of an illumination light flux from the detecting apparatus at or below an upper limit determined in consideration of safety to the human eyes, and the effective diameter of the illumination light flux may be determined in the light source forming unit 10 with the use of a stop.

Fourth Embodiment

Figure 8:
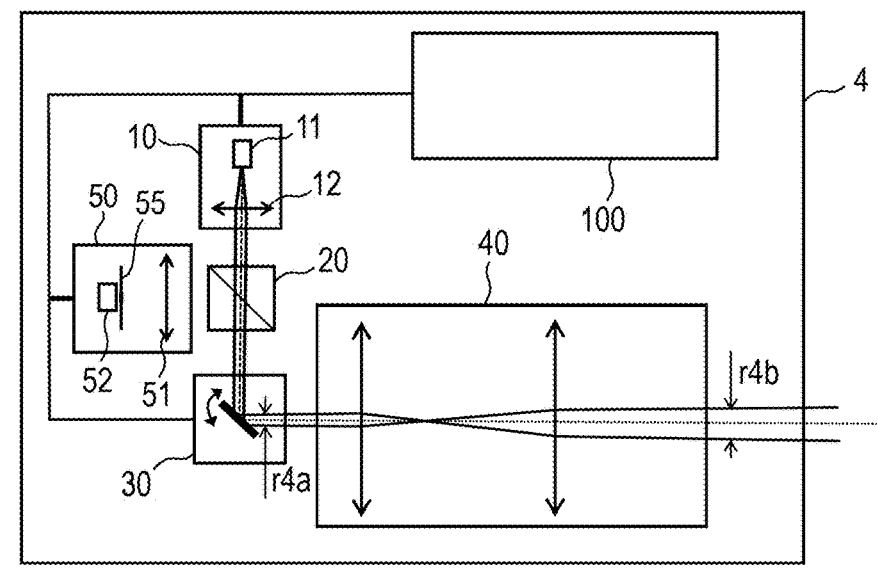
FIG. 8 is schematic sectional views of a detecting apparatus according to a fourth embodiment of the present invention.
Figure 8:
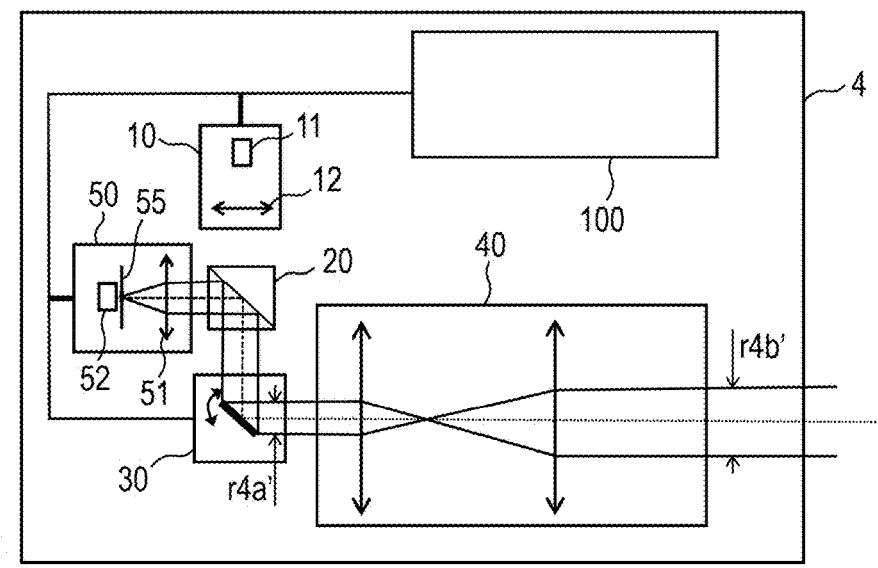
Figure 8:
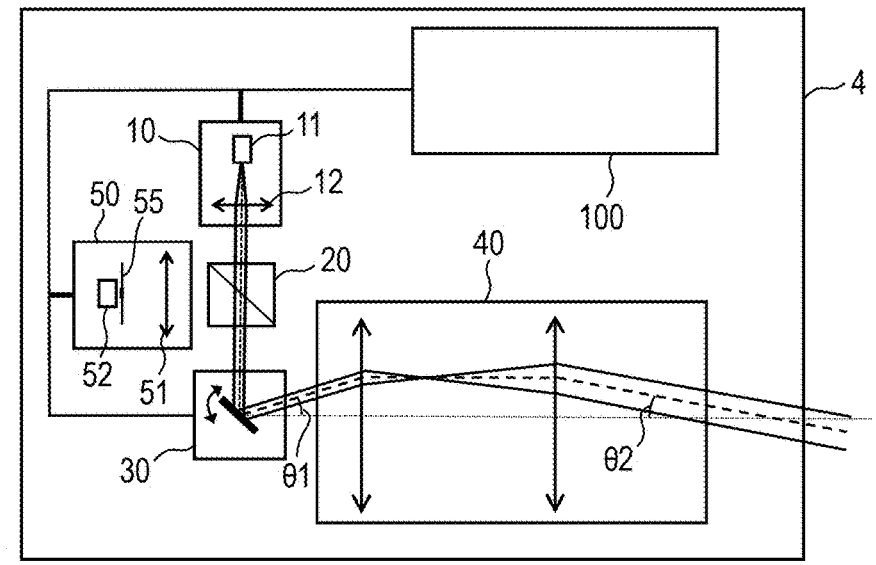

FIG. 8 is schematic sectional views of a detecting apparatus 4 according to a fourth embodiment of the present invention. In FIG. 8, a light path for illumination and a light path for light reception are illustrated separately.

The detecting apparatus 4 according to the fourth embodiment has a configuration similar to that of the detecting apparatus 1 according to the first embodiment, except that a viewing field stop 55 is newly provided in the light receiving unit 50, and a member in the detecting apparatus 4 that is the same as the one in the detecting apparatus 1 is denoted by the same reference number in order to omit a description on the member.

The light receiving unit 50 includes the light collecting optical system 51, the light receiving element 52, and the viewing field stop (a stop) 55. The viewing field stop 55 is provided at a light collection point of the light collecting optical system 51 to limit the light flux diameter of a light flux collected by the light collecting optical system 51.

A light flux including a reflected light flux from an illuminated object is collected by the light collecting optical system 51, passes through an aperture in the viewing field stop 55, and is received by the light receiving element 52.

A parallel light flux that has been emitted from the light source forming unit 10 and has a light flux diameter r4a passes through the illumination light-received light splitting unit 20, is deflected by the driven mirror 30, and turns into an illumination light flux having a light flux diameter r4b on an emission surface via the telescope 40 to illuminate an object outside the detecting apparatus 4.

Then, from the emission surface of the telescope 40, there re-enters a light flux which includes a reflected light flux reflected by the illuminated object and which has an effective diameter (i.e., the effective emission diameter of the telescope 40) r4b'. The light flux that has re-entered travels through the telescope 40 and is deflected by the driven mirror 30 to turn into a light flux having the light flux diameter r4a'. The deflected light flux is deflected in the illumination light-received light splitting unit 20 in a direction different from the direction of the illumination light flux to be received by the light receiving unit 50.

The control unit 100 measures a difference between a light reception time, which is acquired in the light receiving element 52, and a light emission time of the light source 11, or a difference between the phase of a received-light signal, which is acquired in the light receiving element 52, and the phase of an output signal from the light source 11. The difference is multiplied by the speed of light to determine the distance from the object.

As illustrated in FIG. 8, in the detecting apparatus 4 according to the fourth embodiment, the driven mirror 30 is driven at high speed and hence is required to have a small diameter in consideration of weight, with the result that the effective diameter of a light flux deflected by the driven mirror 30 is naturally small. Accordingly, the driven mirror 30 limits, with ease, the effective diameter of a light flux that includes a reflected light flux from an illuminated object.

The effective diameter r4b' of the light flux re-entering from the emission surface of the telescope 40 is expressed by Expression (13) below with the use of the effective diameter r4a' of the driven mirror 30 and the optical magnification β ($|β|>1$) of the telescope 40.

[Math. 13]

$$r4b' = r4a' \times |\beta| \qquad (13)$$

As illustrated in FIG. 8, the effective diameter r4b' of the light flux is $|β|$ (>1) times larger than the effective diameter r4a' of the driven mirror 30. The detecting apparatus 4 according to the fourth embodiment is accordingly capable of receiving more of reflected and scattered light fluxes from an object than when the telescope 40 is not provided.

A deflection angle θ2 of a principal ray of an illumination light flux exiting from the telescope 40 is expressed by Expression (14) below with the use of a deflection angle θ1 of a principal ray of a parallel light flux deflected by the driven mirror 30 and the optical magnification β of the telescope 40.

[Math. 14]

$$\theta 2 = \frac{\theta 1}{|\beta|} \qquad (14)$$

As illustrated in FIG. 8, the deflection angle θ2 of the principal ray of the illumination light flux is smaller than the deflection angle θ1 of the principal ray of the parallel light flux deflected by the driven mirror 30 because the optical magnification β of the telescope 40 is larger than 1.

The angle of view is consequently narrow in the detecting apparatus 4 according to the fourth embodiment, but the detection interval is narrow as well, with the result that the detection resolution can be improved.

Figure 9:
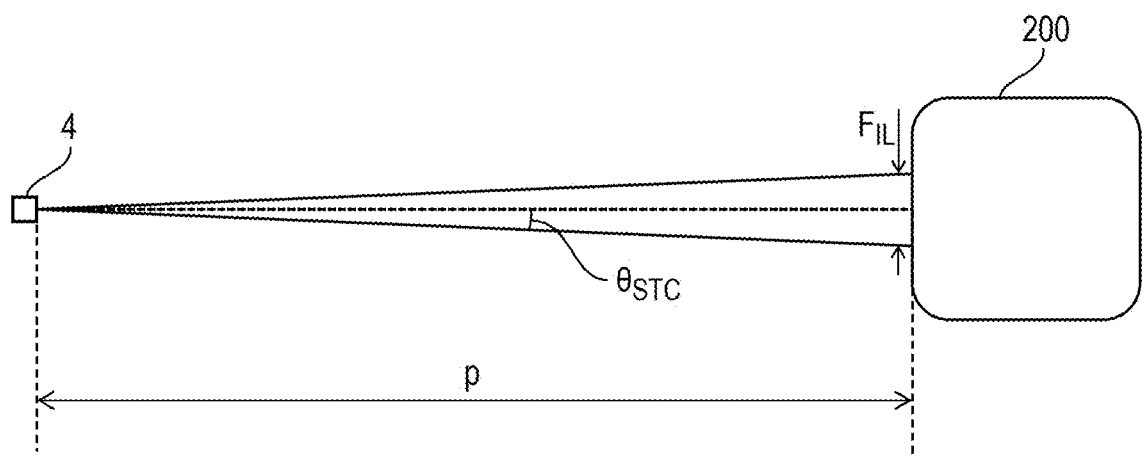
FIG. 9 is a diagram for illustrating how reflected light from an object re-enters the detecting apparatus according to the fourth embodiment.

FIG. 9 is a diagram for illustrating how a light flux from an object 200 re-enters the detecting apparatus 4 according to the fourth embodiment.

The distance from the detecting apparatus 4 to the object 200 is given as p, an area in which the object 200 is illuminated is given as $\varphi F_{IL}$, and the maximum angle of view of the light flux received on the emission surface of the telescope 40 is given as $\theta_{STC}$.

When the maximum angle of view $\theta_{STC}$ of the light flux received on the emission surface of the telescope 40 is larger than the angle of view of the illuminated object 200, the light receiving element 52 also receives unnecessary light, such as a light flux from outside the angle of view and a scattered light flux generated inside the apparatus and outside the angle of view.

It is therefore preferred to configure the detecting apparatus 4 according to the fourth embodiment so that Expression (15) below is satisfied.

[Math. 15]

$$\theta_{STC} \leq \tan^{-1}\left(\frac{F_{IL}}{2p}\right) \qquad (15)$$

Figure 10:
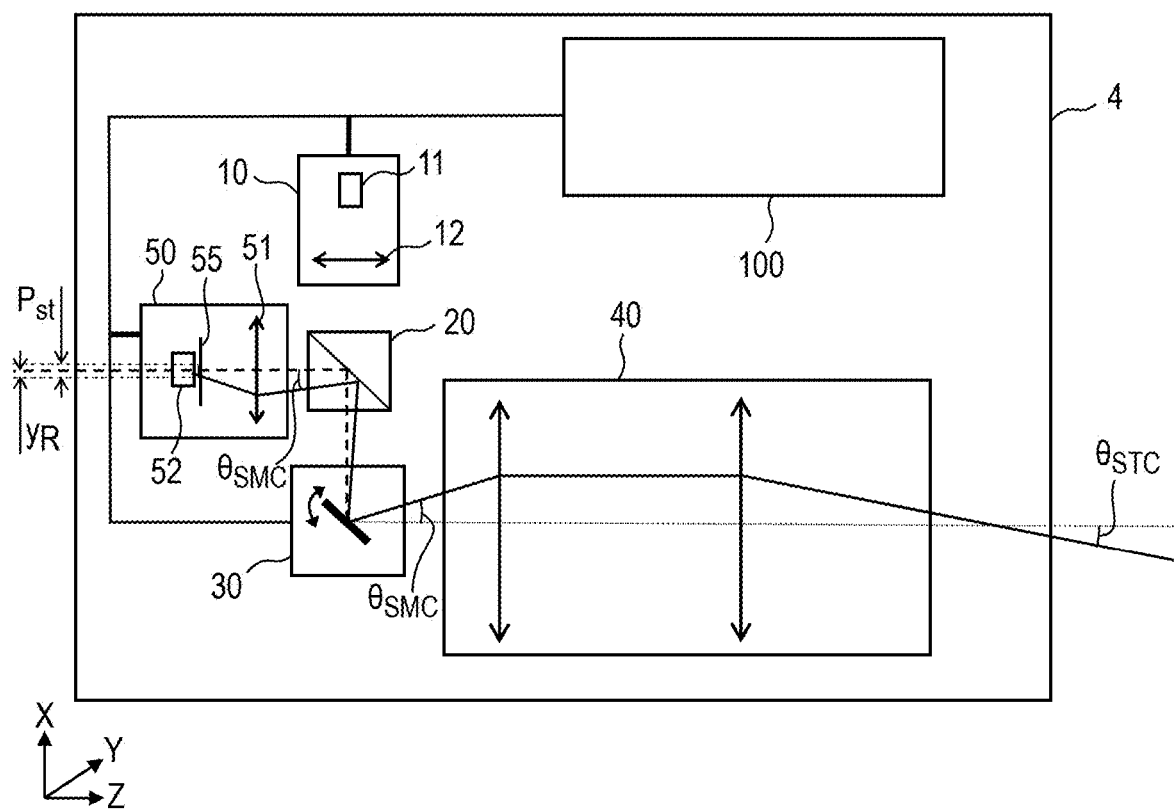
FIG. 10 is a schematic sectional view of the detecting apparatus according to the fourth embodiment.

FIG. 10 is a diagram for illustrating how a light flux from the object 200 is received by the light receiving element 52 in the detecting apparatus 4 according to the fourth embodiment, and a principal ray is illustrated in FIG. 10.

As illustrated in FIG. 10, when an angle at which the light flux from the object 200 enters a surface of the driven mirror 30 while the driven mirror 30 is still is given as $\theta_{SMC}$, the angle $\theta_{SMC}$ is expressed by Expression (16) below with the use of the optical magnification β of the telescope 40.

[Math. 16]

$$\theta_{SMC} = \theta_{STC} \times |\beta| \qquad (16)$$

Accordingly, when the focal length of the light collecting optical system 51 is given as $f_c$, an image height $y_R$ of the light flux collected on the light receiving surface 52D of the light receiving element 52 while the driven mirror 30 is still from the maximum angle of view is expressed by Expression (17) below.

[Math. 17]

$$y_R = f_c \times \tan \theta_{SMC} \qquad (17)$$

Accordingly, an effective light reception diameter D of the light receiving element 52 is preferred to be set so as to satisfy Expression (18) below in order to receive the light flux from the object 200 with efficiency, that is, in order to avoid receiving unnecessary light.

[Math. 18]

$$D \leq 2 \times y_R \qquad (18)$$

In practice, adjustment of the focal length $f_c$ of the light collecting optical system 51 is chosen more often with the objective of versatility than limitation of the effective light reception diameter D of the light receiving element, and there are cases in which the effective light reception diameter D cannot be designed so as to satisfy Expression (18).

In such cases, the light receiving angle of view of the light receiving element 52 can be limited to a desired angle of view with the provision of the viewing field stop 55 at the light collection point of the light collecting optical system 51.

When the aperture diameter of the viewing field stop 55 is given as $P_{st}$, the aperture diameter $P_{st}$ is designed so as to satisfy Expression (19) below.

[Math. 19]

$$P_{st} \leq 2 \times y_R \qquad (19)$$

By providing the viewing field stop 55 in this manner, only a light flux from a desired angle of view can be received even when the effective light reception diameter D cannot be designed so as to satisfy Expression (18). The reception of unnecessary light, such as light fluxes from other angle of views, as well as reflected or scattered light fluxes inside the apparatus, can thus be suppressed.

In the fourth embodiment, Expression (19) is set as the condition for the aperture diameter $P_{st}$ of the viewing field stop 55 with a single light flux. In practice, however, the spot diameter at the light collection point is required to be taken into consideration as well, and a range slightly wider than Expression (19) may be set for the aperture diameter $P_{st}$ of the viewing field stop 55 with the objective of receiving light in a large amount.

About an about half of a received light flux at the desired angle of view is blocked by an aperture stop, and the amount of received light outside the optical axis is accordingly halved. However, when the spot diameter at the aperture portion is large, the amount of received light outside the optical axis drops slowly and much of a received light flux outside the angle of view is received as well, with the result that an S/N ratio is poor with respect to the amount of received light inside the optical axis. The size of the object is incorrectly determined as a result.

Accordingly, what is important is to suppress the reception of unnecessary light while taking in much of a reflected light flux, in a manner that balances the former and the latter. The aperture diameter $P_{st}$ of the viewing field stop 55 is therefore determined so that the balance between the former and the latter brings about a maximum improvement in the quality of a received-light signal.

While the illumination area, the light receiving angle of view, and the like are considered to be circular in the description given above, the aperture of the viewing field stop 55 may have a rectangular or elliptical shape depending on the illumination shape, a light receiving angle of view to be detected, or other factors.

According to the detecting apparatus 4 of the fourth embodiment, unnecessary light can thus be blocked appropriately while taking in much of a reflected light flux from an object, with the result that an object can be ranged from a longer distance with an improved ranging precision. The detection resolution in the detection of the size of an object can be improved as well because the angle of view is limited.

Fifth Embodiment

Figure 11:
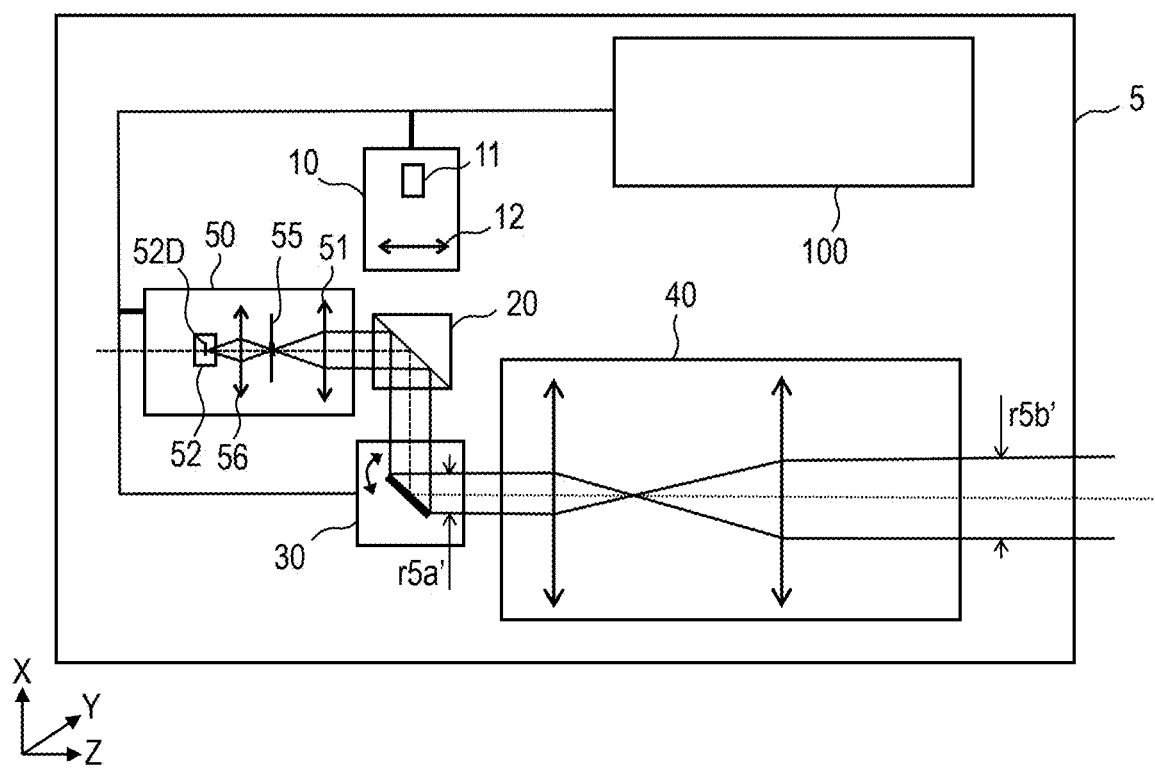
FIG. 11 is a schematic sectional view of a detecting apparatus according to a fifth embodiment of the present invention.

FIG. 11 is a schematic sectional view of a detecting apparatus 5 according to a fifth embodiment of the present invention. A light path for light reception is also illustrated in FIG. 11.

The detecting apparatus 5 according to the fifth embodiment has a configuration similar to that of the detecting apparatus 4 according to the fourth embodiment, except that an re-imaging optical system 56 is newly provided in the light receiving unit 50, and a member in the detecting apparatus 5 that is the same as the one in the detecting apparatus 4 is denoted by the same reference number in order to omit a description on the member.

The light receiving unit 50 includes the light collecting optical system 51, the light receiving element 52, the viewing field stop 55, and the re-imaging optical system (a second imaging optical system) 56. The re-imaging optical system 56 is provided between the viewing field stop 55 and the light receiving element 52, to thereby put the viewing field stop 55 and the light receiving surface 52D of the light receiving element 52 into a substantially conjugate relation with each other. The re-imaging optical system 56 collects a light flux that has passed through the viewing field stop 55 onto the light receiving surface 52D of the light receiving element 52.

A light flux including a reflected light flux that is reflected from an object illuminated by the detecting apparatus 5 according to the fifth embodiment re-enters from the emission surface of the telescope 40. The light flux that has re-entered travels through the telescope 40, and is deflected by the driven mirror 30 to turn into a light flux having a light flux diameter r5a'. The deflected light flux is deflected by the illumination light-received light splitting unit 20 in a direction different from the direction of the illumination light flux to be received by the light receiving unit 50.

The control unit 100 measures a difference between a light reception time, which is acquired in the light receiving element 52, and a light emission time of the light source 11, or a difference between the phase of a received-light signal, which is acquired in the light receiving element 52, and the phase of an output signal from the light source 11. The difference is multiplied by the speed of light to determine the distance from the object.

In the detecting apparatus 5, the light receiving surface 52D of the light receiving element 52 and the viewing field stop 55 are ideally arranged so as to be adjacent to each other.

However, when the light receiving surface 52D is in the interior of the light receiving element 52, a numerical aperture NA of the light collecting optical system 51 is too large in terms of holding performance, and hence there are cases in which not all of the collected light flux can be received by the light receiving element 52.

Figure 12A:
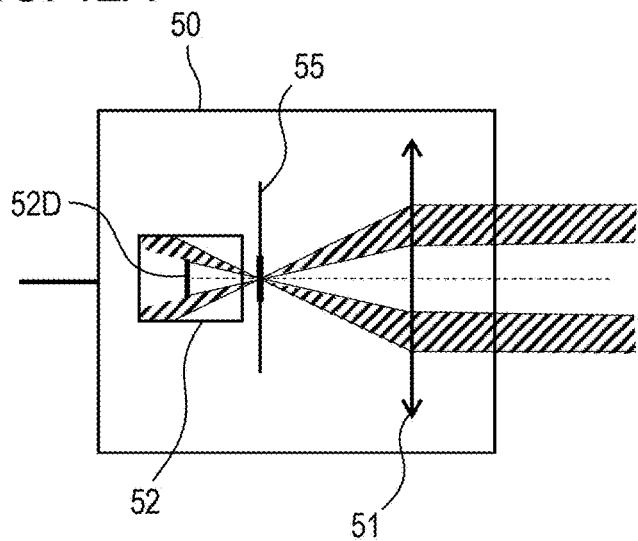
FIG. 12A is a partially enlarged view of a detecting apparatus of a comparative example.
Figure 12B:
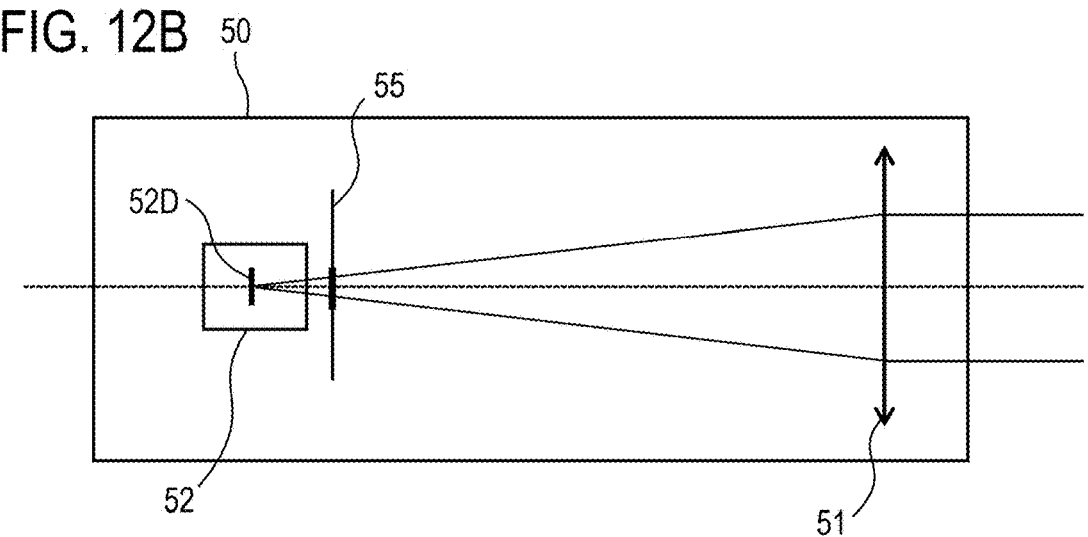
FIG. 12B is a partially enlarged view of a detecting apparatus of another comparative example.
Figure 12C:
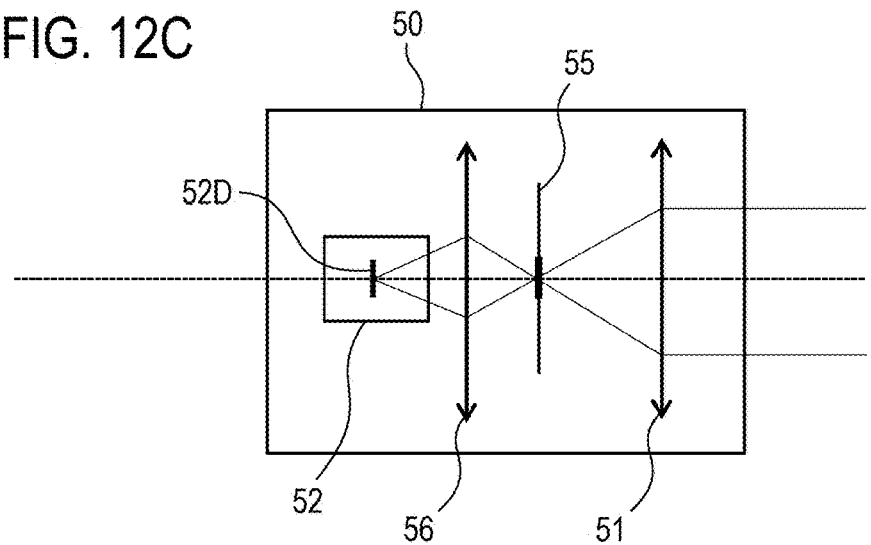
FIG. 12C is a partially enlarged view of the detecting apparatus according to the fifth embodiment.

FIG. 12A and FIG. 12B are each a partially enlarged view of the detecting apparatus 5 as a comparative example. FIG. 12C is a partially enlarged view of the detecting apparatus 5 according to the fifth embodiment.

In FIG. 12A, the light receiving surface 52D is closer to the inside than, for example, a holding unit (not shown) of the light receiving element 52 is, and the collected light flux that has passed through the viewing field stop 55 spreads on the light receiving surface 52D behind the viewing field stop 55 to be wider than the surface area of the light receiving surface 52D. Light illustrated as hatched portions is not received as a result.

This can be prevented by lengthening the focal length $f_c$ of the light collecting optical system 51 as is understood from Expression (17) and Expression (19). In that case, however, the light path behind the light collecting optical system 51 is extended as illustrated in FIG. 12B, and the size of the apparatus is increased.

As illustrated in FIG. 12C, the detecting apparatus 5 according to the fifth embodiment deals with the issue by providing the re-imaging optical system 56 between the viewing field stop 55 and the light receiving element 52. This forms an image of the viewing field stop 55 on the light receiving surface 52D of the light receiving element 52, and can accordingly prevent the loss of the light in the hatched portions representing light that cannot be received.

As described above, according to the detecting apparatus 5 of the fifth embodiment, a reflected light flux can be received with efficiency irrespective of the location of the light receiving surface 52D of the light receiving element 52 with the provision of the re-imaging optical system 56 between the viewing field stop 55 and the light receiving element 52, and an increase in the size of the apparatus can be prevented as well.

Sixth Embodiment

Figure 13:
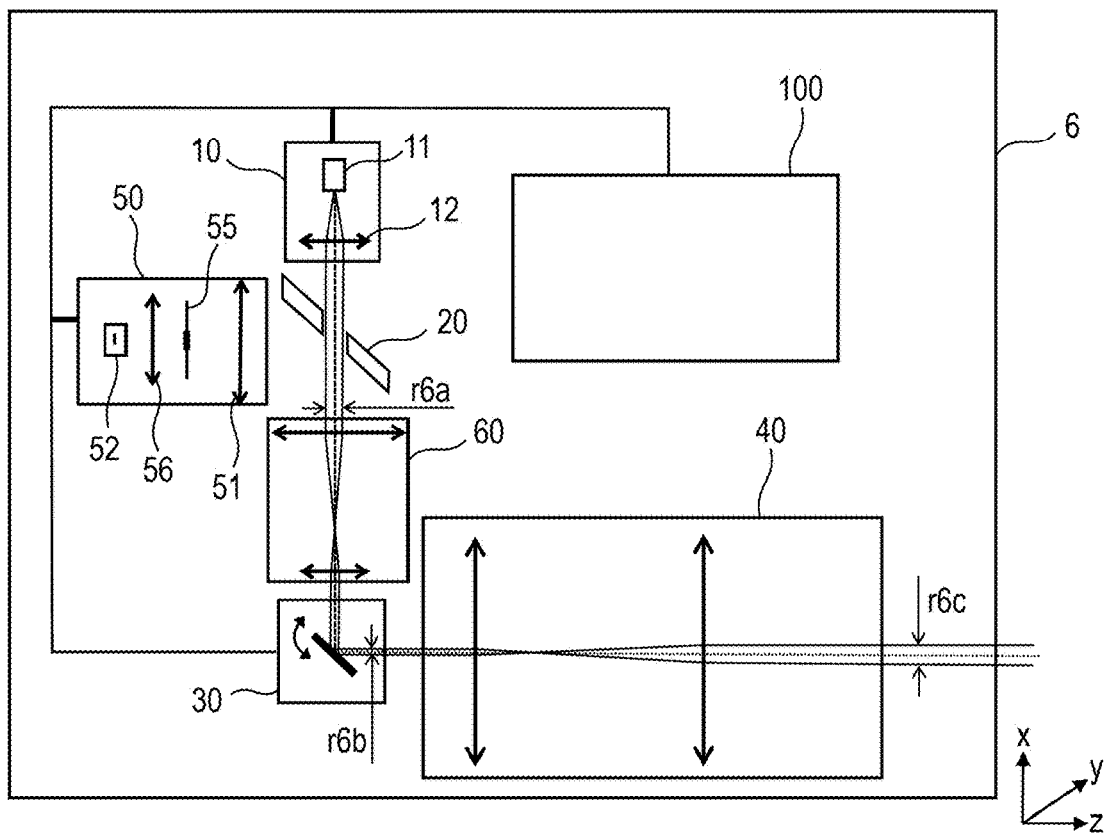
FIG. 13 is schematic sectional views of a detecting apparatus according to a sixth embodiment of the present invention.
Figure 13:
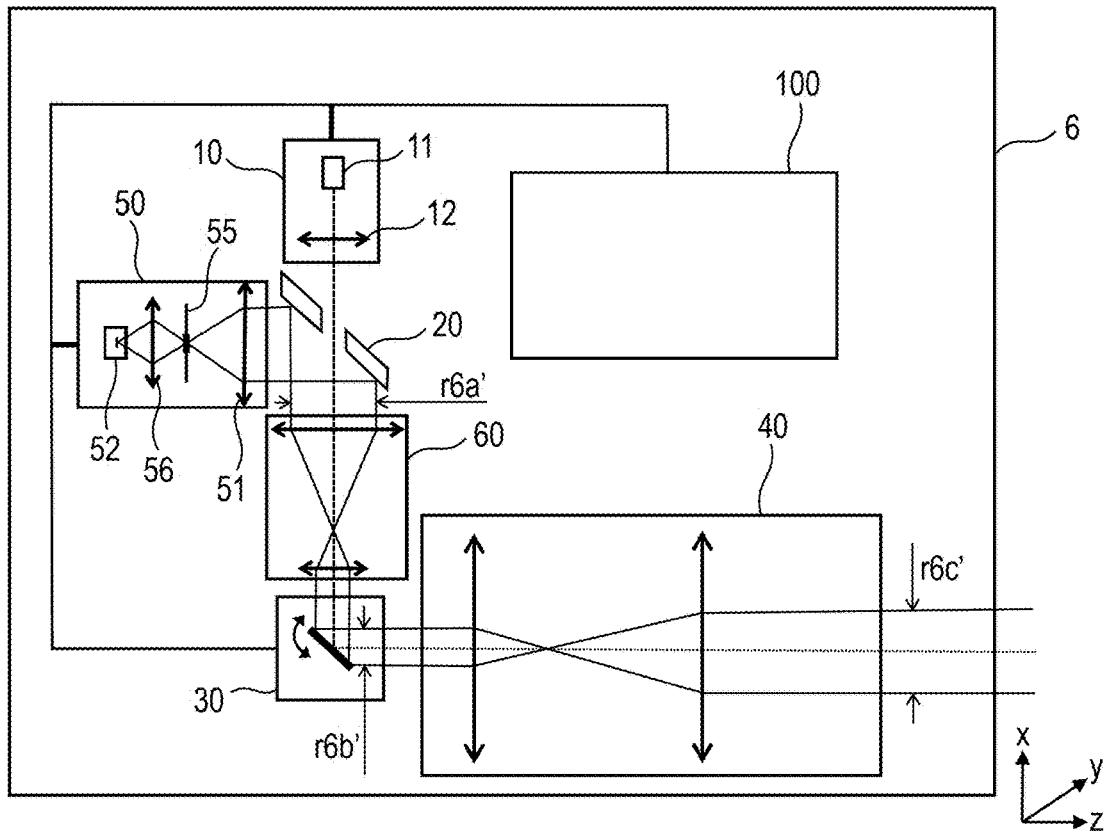

FIG. 13 is schematic sectional views of a detecting apparatus 6 according to a sixth embodiment of the present invention. In FIG. 13, a light path for illumination and a light path for light reception are illustrated separately.

The detecting apparatus 6 according to the sixth embodiment has a configuration similar to that of the detecting apparatus 5 according to the fifth embodiment, except that the variable power optical system 60 is newly provided, and a member in the detecting apparatus 6 that is the same as the one in the detecting apparatus 5 is denoted by the same reference number in order to omit a description on the member.

The illumination light-received light splitting unit 20 in the detecting apparatus 6 according to the sixth embodiment is the perforated mirror 20.

The variable power optical system 60 has the optical magnification β' (|β'|<1), and converts a parallel light flux that has passed through the perforated mirror 20 and has a light flux diameter r6a into an illumination light flux having a light flux diameter r6b, which is smaller than r6a.

Specifically, the light flux diameter r6b is expressed by Expression (20) below with the use of the effective diameter r6a and the optical magnification β' of the variable power optical system 60.

[Math. 20]

$$r6b = r6a \times |\beta'| \quad (20)$$

The light flux diameter r6b of the illumination light flux that has passed through the variable power optical system 60 is smaller than the effective diameter of the driven mirror 30.

The parallel light flux that has been emitted from the light source forming unit 10 and has the light flux diameter r6a passes through the perforated mirror 20, and is converted by the variable power optical system 60 into an illumination light flux having the light flux diameter r6b. The illumination light flux is deflected by the driven mirror 30, and turns into an illumination light flux having a light flux diameter r6c on the emission surface via the telescope 40 to illuminate an object outside the detecting apparatus 6.

Then, from the emission surface of the telescope 40, there re-enters a light flux which includes a reflected light flux reflected by the illuminated object and which has an effective diameter (i.e., the effective emission diameter of the telescope 40) r6c'. The light flux that has re-entered travels through the telescope 40 and is deflected by the driven mirror 30 to turn into a light flux having a light flux diameter r6b'. The deflected light flux is then converted by the variable power optical system 60 into a received light flux having a light flux diameter r6a', which is larger than r6b'. The received light flux is deflected at the perforated mirror 20 in a direction different from the direction of the illumination light flux to be received by the light receiving unit 50.

The control unit 100 then measures a difference between a light reception time, which is acquired in the light receiving element 52, and a light emission time of the light source 11, or a difference between the phase of a received-light signal, which is acquired in the light receiving element 52, and the phase of an output signal from the light source 11. The difference is multiplied by the speed of light to determine the distance from the object.

As illustrated in FIG. 13, in the detecting apparatus 6 according to the sixth embodiment, the driven mirror 30 is driven at high speed and hence is required to have a small diameter in consideration of weight, with the result that the effective diameter of a light flux deflected by the driven mirror 30 is naturally small. Accordingly, the driven mirror 30 limits, with ease, the effective diameter of a light flux that includes a reflected light flux from an illuminated object.

Accordingly, the effective diameter r6b' of the light flux can be considered as equal to the effective diameter of the driven mirror 30.

As illustrated in FIG. 13, the light flux diameter r6a' of the light flux entering the perforated mirror 20 from the variable power optical system 60 is expressed by Expression (21) below with the use of the effective diameter r6b' of the reflected light and the optical magnification β' of the variable power optical system 60.

[Math. 21]

$$r6a' = \frac{r6b'}{|\beta'|} \quad (21)$$

When the diameter of the opening formed in the perforated mirror 20 is given as H, the proportion of the amount of light that cannot be received as a reception signal by the light receiving unit 50 due to the perforated mirror 20, that is, a loss ratio R at which a portion of the received light flux is lost due to the perforated mirror 20, is expressed by Expression (22) below.

[Math. 22]

$$R = \frac{H^2}{\left(\frac{r6b'}{|\beta'|}\right)^2} \quad (22)$$

When the variable power optical system 60 is not provided as described in the fifth embodiment with reference to FIG. 11, the light flux diameter r6a' of the light flux entering the perforated mirror 20 from the driven mirror 30 is equal to the effective diameter of the driven mirror 30, namely, the effective diameter r6b' of the light flux.

When the light flux diameter of the parallel light flux emitted from the light source forming unit 10 is r6a, and the light flux diameter of the parallel light flux that passes through the perforated mirror 20 and enters the driven mirror 30 is r6b, r6a equals r6b.

In this case, the proportion of the amount of light that cannot be received as a reception signal by the light receiving unit 50 due to the perforated mirror 20, that is, a loss ratio R' at which a portion of the received light is lost due to the perforated mirror 20, is expressed by Expression (23) below.

[Math. 23]

$$R' = \frac{H^2}{r6b'^2} \quad (23)$$

From Expression (22) and Expression (23), the ratio of the loss ratios R and R' is expressed by Expression (24) below.

[Math. 24]

$$\frac{R}{R'} = \frac{\left(\frac{r6b'}{|\beta'|}\right)^2}{\frac{H^2}{r6b'^2}} = (\beta')^2 \quad (24)$$

Thus, the inclusion of the variable power optical system 60 enables the detecting apparatus 6 according to the sixth embodiment to reduce the proportion of the amount of light that cannot be received as a reception signal by the light receiving unit 50 due to the perforated mirror 20, that is, the loss ratio of received light due to the perforated mirror 20, by $(\beta')^2$ times.

In the detecting apparatus 6 according to the sixth embodiment, an angle of view $\theta_{SMC}'$ at which a light flux enters the perforated mirror 20 from the variable power optical system 60 while the driven mirror is still is expressed by Expression (25) below with the use of the angle $\theta_{SMC}$ at which a light flux from an object enters a surface of the driven mirror 30 while the driven mirror 30 is still and the optical magnification β' of the variable power optical system 60.

[Math. 25]

$$\theta_{SMC}' = \theta_{SMC} \times |\beta'| \quad (25)$$

The optical magnification β' of the variable power optical system 60 is less than 1, and $\theta_{SMC}'$ is accordingly smaller than $\theta_{SMC}$. This means that the incident image height of a received light flux on a light collecting surface of the light collecting optical system 51 (i.e., on the light receiving surface 52D) from the maximum angle of view is decreased with the provision of the variable power optical system 60.

Therefore, the presence of the variable power optical system 60 requires the focal length $f_c$ of the light collecting optical system 51 to be lengthened.

However, in the detecting apparatus 6 according to the sixth embodiment, the length of a light path from the perforated mirror 20 to the light receiving surface 52D of the light receiving element 52 can be shortened because of the re-imaging optical system 56 provided between the light collecting optical system 51 and the light receiving element 52.

The detecting apparatus 6 accordingly has another effect in that an increase in the size of the apparatus resulting from the presence of the variable power optical system 60 is prevented by providing the re-imaging optical system 56.

In the detecting apparatus 6 according to the sixth embodiment, the collimator 12 converts a divergent light flux emitted from the light source 11 in the light source forming unit 10 into a parallel light flux having the light flux diameter r6a, which is smaller than the opening diameter H of the perforated mirror 20. However, the detecting apparatus 6 is not limited thereto, and a stop may be provided between the light source forming unit 10 and the perforated mirror 20.

The light source forming unit 10, which is made up solely of the light source 11 and the collimator 12 in the detecting apparatus 6 according to the sixth embodiment, is not limited thereto. When the angle of divergence from the light source 11 is asymmetric, a cylindrical lens or the like may be provided in the light source forming unit 10 to shape a divergent light flux emitted from the light source 11, and subsequently adjust the light flux diameter with the provided stop.

What is important here is to keep the light amount of an illumination light flux from the detecting apparatus at or below an upper limit determined in consideration of safety to the human eyes, and the effective diameter of the illumination light flux may be determined in the light source forming unit 10 with the use of a stop.

As described above, according to the detecting apparatus 6 of the sixth embodiment, the efficiency of light reception at the perforated mirror 20 can be improved and much of reflected and scattered light fluxes from an illuminated distant object can be taken in with the provision of the variable power optical system 60 between the perforated mirror 20 and the driven mirror 30. In addition, with the provision of the re-imaging optical system 56 between the viewing field stop 55 and the light receiving element 52, a received light flux can be received with efficiency irrespective of the location of the light receiving surface 52D of the light receiving element 52, and an increase in the size of the apparatus can be prevented as well.

Seventh Embodiment

Figure 14:
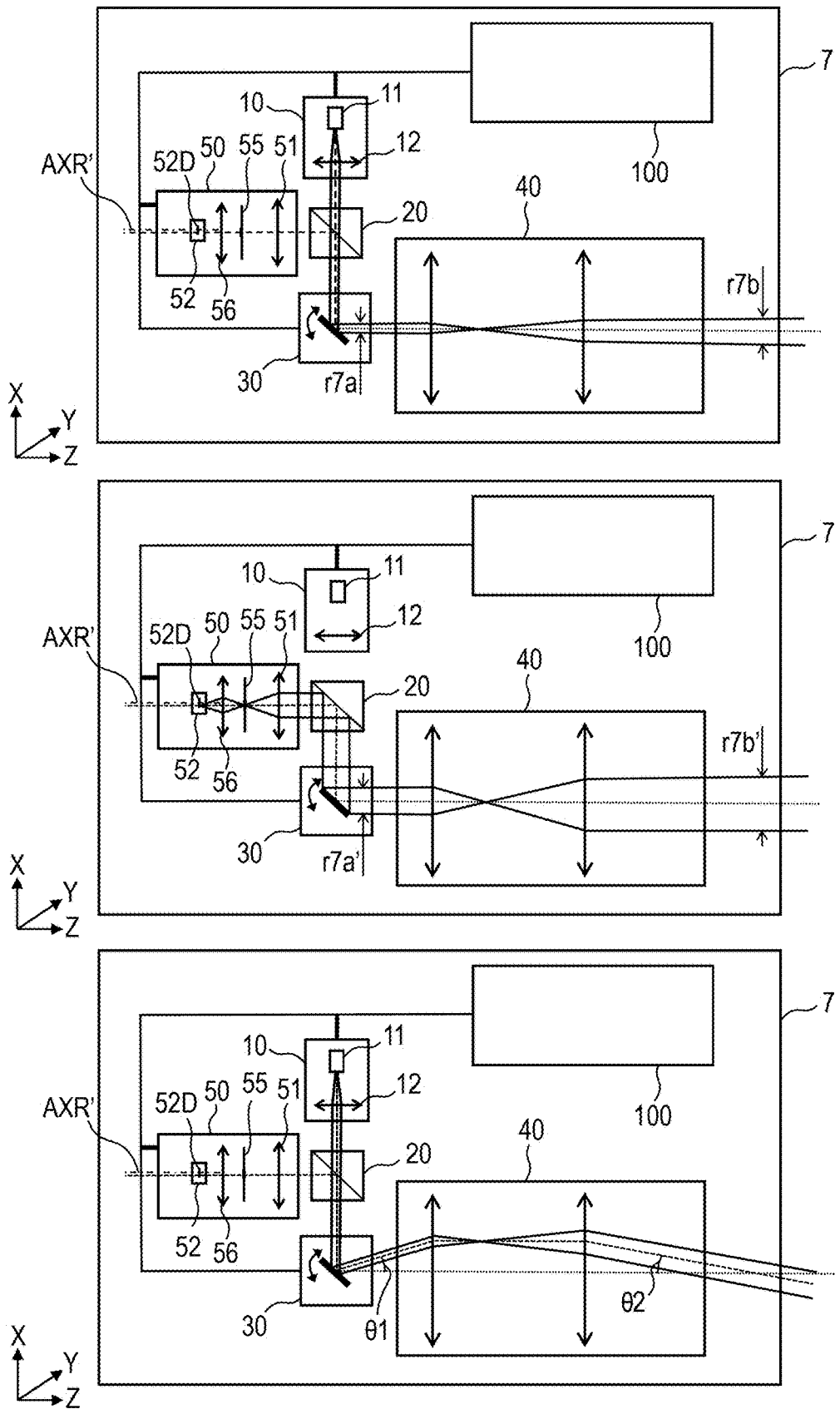
FIG. 14 is schematic sectional views of a detecting apparatus according to a seventh embodiment of the present invention.

FIG. 14 is schematic sectional views of a detecting apparatus 7 according to a seventh embodiment of the present invention. In FIG. 14, a light path for illumination and a light path for light reception are illustrated separately.

The detecting apparatus 7 according to the seventh embodiment has a configuration similar to that of the detecting apparatus 5 according to the fifth embodiment, and a member in the detecting apparatus 7 that is the same as the one in the detecting apparatus 5 is denoted by the same reference number in order to omit a description on the member.

A parallel light flux that has been emitted from the light source forming unit 10 and has a light flux diameter r7a passes through the illumination light-received light splitting unit 20, is deflected by the driven mirror 30, and turns into an illumination light flux having a light flux diameter r7b on the emission surface via the telescope 40 to illuminate an object outside the detecting apparatus 7.

Then, from the emission surface of the telescope 40, there re-enters a light flux which includes a reflected light flux reflected by the illuminated object and which has an effective diameter (i.e., the effective emission diameter of the telescope 40) r7b'. The light flux that has re-entered travels through the telescope 40 and is deflected by the driven mirror 30 to turn into a light flux having a light flux diameter r7a'. The deflected light flux is deflected in the illumination light-received light splitting unit 20 in a direction different from the direction of the illumination light flux to be received by the light receiving unit 50.

The control unit 100 measures a difference between a light reception time, which is acquired in the light receiving element 52, and a light emission time of the light source 11, or a difference between the phase of a received-light signal, which is acquired in the light receiving element 52, and the phase of an output signal from the light source 11. The difference is multiplied by the speed of light to determine the distance from the object.

As illustrated in FIG. 14, in the detecting apparatus 7 according to the seventh embodiment, the driven mirror 30 is driven at high speed and hence is required to have a small diameter in consideration of weight, with the result that the effective diameter of a light flux deflected by the driven mirror 30 is naturally small. Accordingly, the driven mirror 30 limits, with ease, the effective diameter of a light flux that includes a reflected light flux from an illuminated object.

The effective diameter r7b' of the light flux re-entering from the emission surface of the telescope 40 is expressed by Expression (26) below with the use of the effective diameter r7a' of the driven mirror 30 and the optical magnification ($|\beta|>1$) of the telescope 40.

[Math. 26]

$$r7b'=r7a1\times|\beta| \qquad (26)$$

As illustrated in FIG. 14, the effective diameter r7b' of the light flux is $|\beta|$ (>1) times larger than the effective diameter r7a' of the driven mirror 30. Accordingly, the detecting apparatus 7 according to the seventh embodiment is capable of receiving more of reflected and scattered light fluxes from an object than when the telescope 40 is not provided.

The deflection angle θ2 of a principal ray of an illumination light flux exiting from the telescope 40 is expressed by Expression (27) below with the use of the deflection angle θ1 of a principal ray of a parallel light flux deflected by the driven mirror 30 and the optical magnification β of the telescope 40.

[Math. 27]

$$\theta 2 = \frac{\theta 1}{|\beta|} \qquad (27)$$

As illustrated in FIG. 14, the deflection angle θ2 of the principal ray of the illumination light flux is smaller than the deflection angle θ1 of the principal ray of the parallel light flux deflected by the driven mirror 30 because the optical magnification β of the telescope 40 is larger than 1.

Consequently, the angle of view is narrow in the detecting apparatus 7 according to the seventh embodiment, but the detection interval is narrow as well, with the result that the detection resolution can be improved.

As described in the fourth embodiment with reference to FIG. 9, the distance from the detecting apparatus 7 to the object 200 is given as p, an area in which the object 200 is illuminated is given as $\varphi F_{IL}$, and the maximum angle of view of the light flux received on the emission surface of the telescope 40 is given as $\theta_{STC}$.

When the maximum angle of view $\theta_{STC}$ of the light flux received on the emission surface of the telescope 40 is larger than the angle of view of the illuminated object 200, the light receiving element 52 also receives unnecessary light, such as a light flux from outside the angle of view and a scattered light flux generated inside the apparatus and outside the angle of view.

It is therefore preferred to configure the detecting apparatus 7 according to the seventh embodiment so that Expression (28) below is satisfied.

[Math. 28]

$$\theta_{STC} \leq \tan^{-1}\left(\frac{F_{IL}}{2p}\right) \qquad (28)$$

As illustrated in FIG. 10, when an angle at which the light flux from the object 200 enters a surface of the driven mirror 30 while the driven mirror 30 is still is given as $\theta_{SMC}$, the angle $\theta_{SMC}$ is expressed by Expression (29) below with the use of the optical magnification β of the telescope 40.

[Math. 29]

$$\theta_{SMC}=\theta_{STC}\times|\beta| \qquad (29)$$

Accordingly, when the focal length of the light collecting optical system 51 is given as $f_c$, the image height $y_R$ of the light flux collected on the light receiving surface of the light receiving element 52 while the driven mirror 30 is still from the maximum angle of view is expressed by Expression (30) below.

[Math. 30]

$$y_R=f_c\times\tan\theta_{SMC} \qquad (30)$$

The re-imaging optical system 56 is disregarded here for the sake of simplification.

Accordingly, the effective light reception diameter D of the light receiving element 52 is set so as to satisfy Expression (31) below in order to receive the light flux from the object 200 with efficiency, that is, in order to avoid receiving unnecessary light.

[Math. 31]

$$D\leq 2\times y_R \qquad (31)$$

In practice, adjustment of the focal length $f_c$ of the light collecting optical system 51 is chosen more often with the objective of versatility than limitation of the effective light reception diameter D of the light receiving element, and there are cases in which the effective light reception diameter D cannot be designed so as to satisfy Expression (31).

In such cases, the light reception angle of view of the light receiving element 52 can be limited to a desired angle of view with the provision of the viewing field stop 55 at the light collection point of the light collecting optical system 51.

When the aperture diameter of the viewing field stop 55 is given as $P_{st}$, the aperture diameter $P_{st}$ is designed so as to satisfy Expression (32) below.

[Math. 32]

$$P_{st} \leq 2 \times y_R \tag{32}$$

By providing the viewing field stop 55 in this manner, only a light flux from a desired angle of view can be received even when the effective light reception diameter D cannot be designed so as to satisfy Expression (31). Thus, the reception of unnecessary light, such as light fluxes from other angle of views, as well as light fluxes reflected or scattered inside the apparatus, can be suppressed.

In the seventh embodiment, Expression (32) is set as the condition for the aperture diameter $P_{st}$ of the viewing field stop 55 with a single light flux. In practice, however, the spot diameter at the light collection point is required to be taken into consideration as well, and a range slightly wider than Expression (32) may be set for the aperture diameter $P_{st}$ of the viewing field stop 55 with the objective of receiving light in a large amount.

About an about half of a received light flux at the desired angle of view is blocked by an aperture stop, and the amount of received light outside the optical axis is accordingly halved. However, when the spot diameter at the aperture portion is large, the amount of received light outside the optical axis drops slowly and much of a received light flux outside the angle of view is received as well, with the result that the S/N ratio is poor with respect to the amount of received light inside the optical axis. The size of the object is incorrectly determined as a result.

Accordingly, what is important is to suppress the reception of unnecessary light while taking in much of a reflected light flux, in a manner that balances the former and the latter. The aperture diameter $P_{st}$ of the viewing field stop 55 is therefore determined so that the balance between the former and the latter brings about a maximum improvement in the quality of a received-light signal.

While the illumination area, the light reception angle of view, and the like are considered to be circular in the description given above, the aperture of the viewing field stop 55 may have a rectangular or elliptical shape depending on the illumination shape, a light reception angle of view to be detected, or other factors.

In the manner described above, unnecessary light can be blocked appropriately while taking in much of a reflected light flux from an object, with the result that an object can be ranged from a longer distance with an improved ranging precision. The detection resolution in the detection of the size of an object can be improved as well because the angle of view is limited.

In the detecting apparatus 7 according to the seventh embodiment, the re-imaging optical system 56 is provided between the viewing field stop 55 and the light receiving element 52 as illustrated in FIG. 14 for a reason given below.

In the detecting apparatus 7, the light receiving surface 52D of the light receiving element 52 and the viewing field stop 55 are ideally arranged so as to be adjacent to each other.

However, when the light receiving surface 52D is in the interior of the light receiving element 52, the numerical aperture NA of the light collecting optical system 51 is too large in terms of holding performance, and hence there are cases in which not all of the collected light flux can be received by the light receiving element 52.

As described in the fifth embodiment with reference to FIG. 12A, when the light receiving surface 52D is closer to the inside than, for example, a holding unit (not shown) of the light receiving element 52, the collected light flux that has passed through the viewing field stop 55 spreads on the light receiving surface 52D behind the viewing field stop 55 to be wider than the surface area of the light receiving surface 52D. A light flux illustrated as hatched portions is not received as a result.

This can be prevented by lengthening the focal length $f_c$ of the light collecting optical system 51 as is understood from Expression (17) and Expression (19). In that case, however, the light path behind the light collecting optical system 51 is extended as illustrated in FIG. 12B, which increases the size of the apparatus.

The detecting apparatus 7 according to the seventh embodiment deals with the issue by providing the re-imaging optical system 56 between the viewing field stop 55 and the light receiving element 52 as illustrated in FIG. 12C. This forms an image of the viewing field stop 55 on the light receiving surface 52D of the light receiving element 52, and can accordingly prevent the loss of the light flux in the above-mentioned hatched portions representing the portions of the light flux that cannot be received.

As described above, according to the detecting apparatus 7 of the seventh embodiment, a reflected light flux can be received with efficiency irrespective of the location of the light receiving surface 52D of the light receiving element 52 with the provision of the re-imaging optical system 56 between the viewing field stop 55 and the light receiving element 52, and an increase in the size of the apparatus can be prevented as well.

In the detecting apparatus 7 according to the seventh embodiment, the angle of the driven mirror 30 is set (tilted) and the telescope 40 is decentered so that the light path of a principal ray of an illumination light flux at the center angle of view in the range of scanning angle of views of the driven mirror 30 does not coincide with the optical axis Ax of the telescope 40 as described in the first embodiment with reference to FIG. 2A and in the second embodiment with reference to FIG. 4, FIG. 5B, and FIG. 6B.

The detecting apparatus 7 according to the seventh embodiment also has a configuration in which the light receiving element 52 or the re-imaging optical system 56 is decentered or tilted so that the center position of the light receiving surface 52D of the light receiving element 52 or the optical axis of the re-imaging optical system 56 does not fall on the optical axis of the detecting apparatus 7 as described below.

In other words, the detecting apparatus 7 according to the seventh embodiment has a configuration in which the light receiving element 52 or the re-imaging optical system 56 is decentered or tilted so that the center position of the light receiving surface 52D of the light receiving element 52 or the optical axis of the re-imaging optical system 56 does not fall on the light path of a principal ray of a light flux at the center angle of view in the range of scanning angle of views of the driven mirror 30 as described below.

Figure 15A:
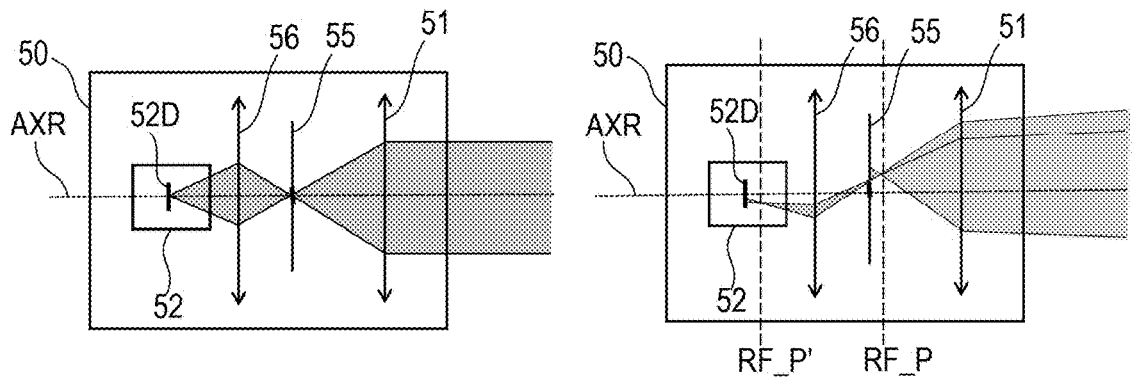
FIG. 15A is a partially enlarged view of a detecting apparatus of a comparative example.
Figure 15B:
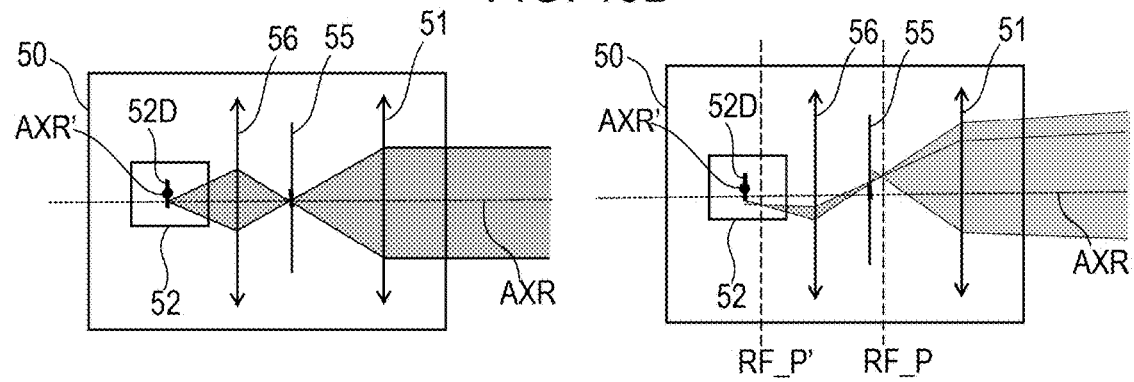
FIG. 15B is a partially enlarged view of the detecting apparatus according to the seventh embodiment.
Figure 15C:
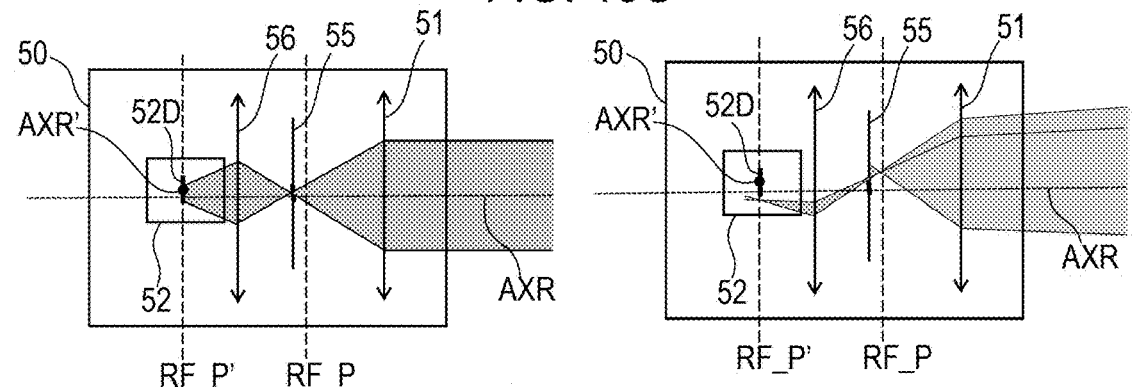
FIG. 15C is a partially enlarged view of the detecting apparatus according to the seventh embodiment.
Figure 15D:
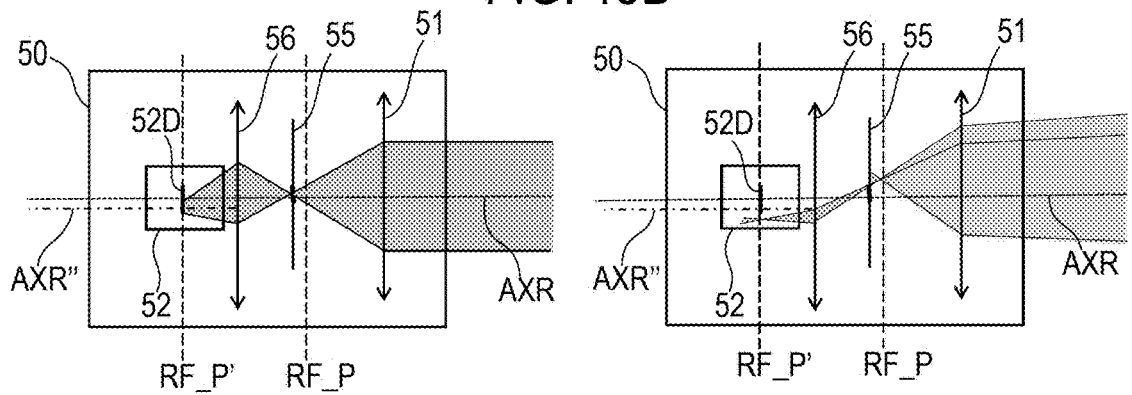
FIG. 15D is a partially enlarged view of the detecting apparatus according to the seventh embodiment.

FIG. 15A is a partially enlarged view of a detecting apparatus of a comparative example. FIG. 15B, FIG. 15C, and FIG. 15D are partially enlarged views of the detecting apparatus 7 according to the seventh embodiment.

The center position of the light receiving surface 52D of the light receiving element 52 is given as AXR', the optical axis of the re-imaging optical system 56 is given as AXR", and the optical axis of the detecting apparatus 7 is given as AXR.

In the detecting apparatus of the comparative example illustrated in FIG. 15A, the center position AXR' of the light receiving surface 52D of the light receiving element 52 and the optical axis AXR" of the re-imaging optical system 56 fall on the optical axis AXR of the detecting apparatus 7 (are not decentered).

As illustrated in FIG. 15A, a light flux from an object is collected by the light collecting optical system 51, passes through the viewing field stop 55, and is collected again by the re-imaging optical system 56 to a central portion of the light receiving surface 52D.

As illustrated in FIG. 15A, unnecessary light is collected once on a virtual plane RF_P in front of the viewing field stop 55 via the light collecting optical system 51, and is then blurringly diffused on the viewing field stop 55. A portion of the unnecessary light passes through the viewing field stop 55, is collected again on a virtual plane RF_P' by the re-imaging optical system 56, and subsequently arrives at the light receiving surface 52D.

Figure 16:
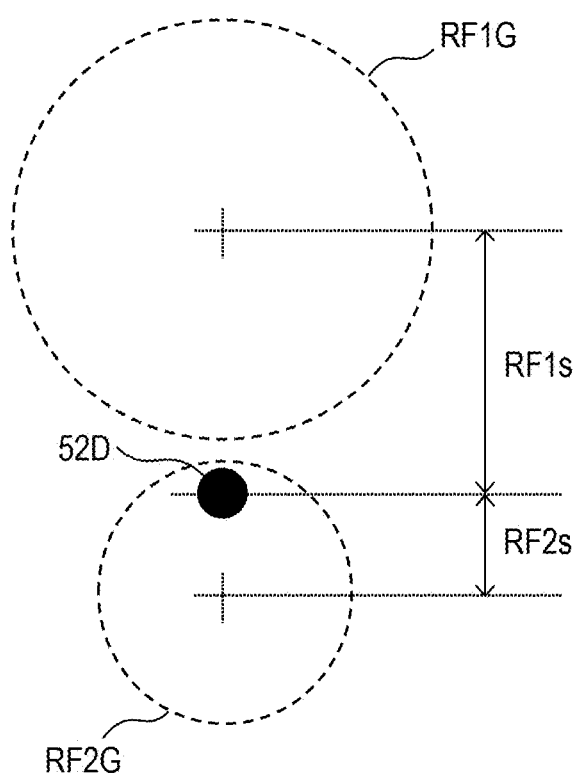
FIG. 16 is a diagram for illustrating a reflected light area that is formed on a light receiving surface of a light receiving element in a detecting apparatus of a comparative example.

FIG. 16 is a diagram for illustrating a positional relation that is observed in this case between the reflected light areas RF1G and RF2G formed on the light receiving surface 52D of the light receiving element 52. The reflected light area RF2G partially overlaps with the light receiving surface 52D due to the unnecessary light, and this depends also on the direction of the decentering of the telescope 40.

In FIG. 15B, the light receiving element 52 in the detecting apparatus 7 according to the seventh embodiment is decentered so that the center position AXR' of the light receiving surface 52D of the light receiving element 52 is off the optical axis AXR of the detecting apparatus 7.

As illustrated in FIG. 15B, a reflected light flux from an object is received on the light receiving surface 52D. Unnecessary light, on the other hand, travels outside the light receiving surface 52D and is accordingly not received.

In FIG. 15C, the light receiving element 52 in the detecting apparatus 7 according to the seventh embodiment is decentered and displaced to the virtual plane RF_P' so that the center position AXR' of the light receiving surface 52D of the light receiving element 52 is off the optical axis AXR of the detecting apparatus 7.

As described above, unnecessary light is collected on the virtual plane RF_P', and the unnecessary light has a small surface area on the light receiving surface 52D of the light receiving element 52 displaced to the virtual plane RF_P'. Accordingly, a reflected light flux from an object is easy to separate from the unnecessary light unless the reflected light flux is blurred much on the light receiving surface 52D.

In FIG. 15D, the re-imaging optical system 56 in the detecting apparatus 7 according to the seventh embodiment is decentered so that the optical axis AXR" of the re-imaging optical system 56 does not coincide with the optical axis AXR of the detecting apparatus 7.

As illustrated in FIG. 15D, the decentering of the re-imaging optical system 56, too, makes the unnecessary light travel outside the light reception range of the light receiving surface 52D to ensure that the unnecessary light is not received while a reflected light flux from an object is received on the light receiving surface 52D.

As described above, according to the detecting apparatus 7 of the seventh embodiment, the reception of unnecessary light can be prevented by the decentering or tilting of the light receiving element 52 or the re-imaging optical system 56 so that the center position of the light receiving surface 52D of the light receiving element 52 or the optical axis of the re-imaging optical system 56 does not fall on the optical axis of the detecting apparatus 7 (in other words, the light path of a principal ray of a light flux at the center angle of view in the range of scanning angle of views of the driven mirror 30).

Eighth Embodiment

Figure 17:
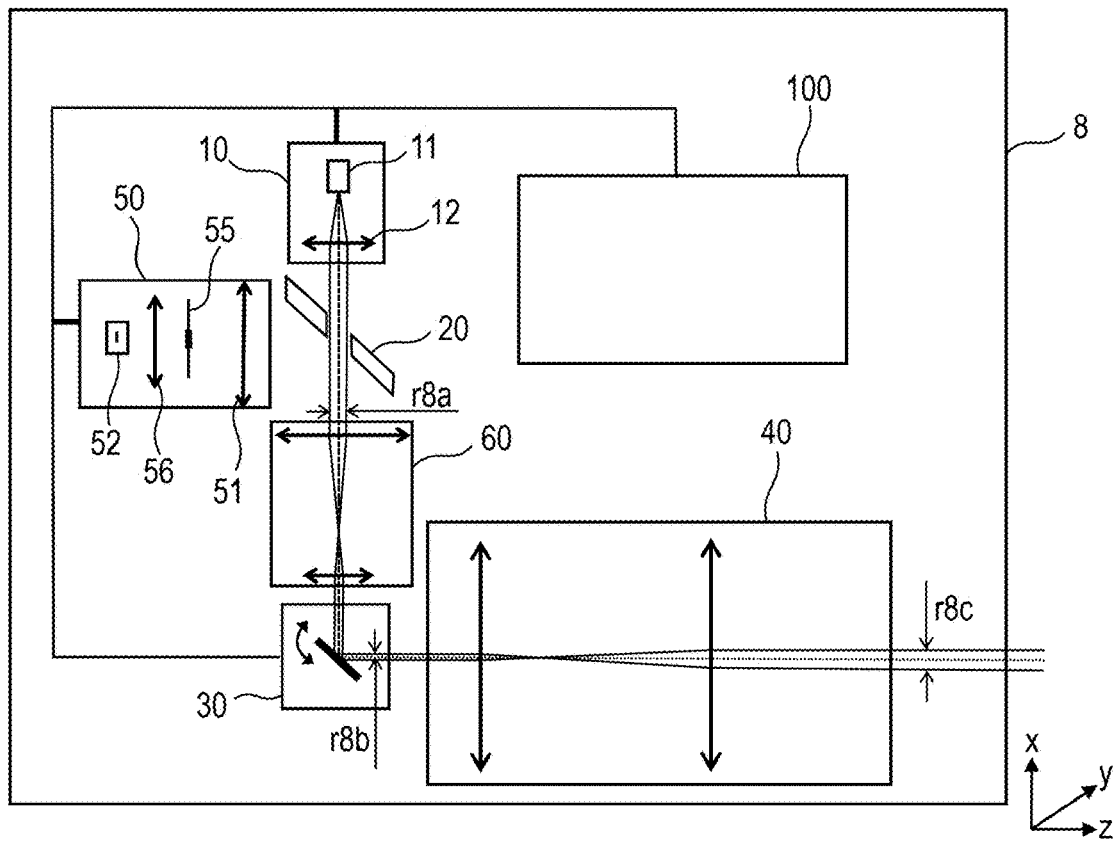
FIG. 17 is schematic sectional views of a detecting apparatus according to an eighth embodiment of the present invention.
Figure 17:
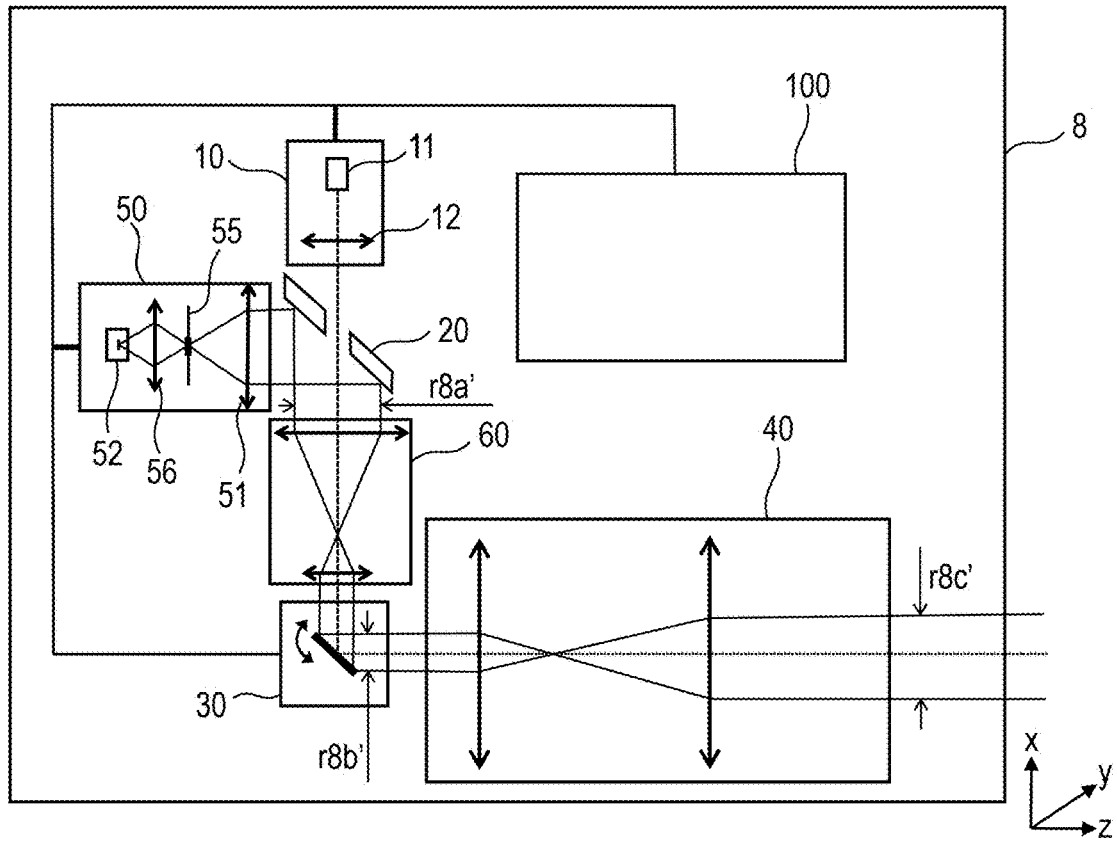

FIG. 17 is schematic sectional views of a detecting apparatus 8 according to an eighth embodiment of the present invention. In FIG. 17, a light path for illumination and a light path for light reception are illustrated separately.

The detecting apparatus 8 according to the eighth embodiment has a configuration similar to that of the detecting apparatus 7 according to the seventh embodiment, except that a variable power optical system 60 is newly provided, and a member in the detecting apparatus 8 that is the same as the one in the detecting apparatus 7 is denoted by the same reference number in order to omit a description on the member.

The illumination light-received light splitting unit 20 in the detecting apparatus 8 according to the eighth embodiment is the perforated mirror 20.

The variable power optical system 60 has the optical magnification $\beta'$ ($|\beta'|<1$), and converts a parallel light flux that has passed through the perforated mirror 20 and has a light flux diameter r8a into an illumination light flux having a light flux diameter r8b, which is smaller than r8a.

Specifically, the light flux diameter r8b is expressed by Expression (33) below with the use of the effective diameter r8a and the optical magnification $\beta'$ of the variable power optical system 60.

[Math. 33]

$$r8b = r8a \times |\beta'| \tag{33}$$

The light flux diameter r8b of an illumination light flux that has passed the variable power optical system 60 is smaller than the effective diameter of the driven mirror 30.

The parallel light flux that has been emitted from the light source forming unit 10 and has the light flux diameter r8a passes through the perforated mirror 20, and is converted by the variable power optical system 60 into an illumination light flux having the light flux diameter r8b. The illumination light flux is deflected by the driven mirror 30, and turns into an illumination light flux having a light flux diameter r8c on the emission surface via the telescope 40 to illuminate an object outside the detecting apparatus 8.

Then, from the emission surface of the telescope 40, there re-enters a light flux which includes a reflected light flux reflected by the illuminated object and which has an effective diameter (i.e., the effective emission diameter of the telescope 40) r8c'. The light flux that has re-entered travels through the telescope 40 and is deflected by the driven mirror 30 to turn into a light flux having a light flux diameter r8b'. The deflected light flux is converted by the variable power optical system 60 into a received light flux having a light flux diameter r8a', which is larger than r8b'. The received light flux is deflected at the perforated mirror 20 in a direction different from the direction of the illumination light flux to be received by the light receiving unit 50.

The control unit 100 then measures a difference between a light reception time, which is acquired in the light receiving element 52, and a light emission time of the light source 11, or a difference between the phase of a received-light signal, which is acquired in the light receiving element 52, and the phase of an output signal from the light source 11. The difference is multiplied by the speed of light to determine the distance from the object.

As illustrated in FIG. 17, in the detecting apparatus 8 according to the eighth embodiment, the driven mirror 30 is driven at high speed and hence is required to have a small diameter in consideration of weight, with the result that the effective diameter of a light flux deflected by the driven mirror 30 is naturally small. Accordingly, the driven mirror 30 limits, with ease, the effective diameter of a light flux that includes a reflected light flux from an illuminated object.

Accordingly, the effective diameter r8b' of the light flux can be considered as equal to the effective diameter of the driven mirror 30.

As illustrated in FIG. 17, the light flux diameter r8a' of the light flux entering the perforated mirror 20 from the variable power optical system 60 is expressed by Expression (34) below with the use of the effective diameter r8b' of the light flux and the optical magnification β' of the variable power optical system 60.

[Math. 34]

$$r8a' = \frac{r8b'}{|\beta'|} \tag{34}$$

When the diameter of the opening formed in the perforated mirror 20 is given as H, the proportion of the amount of light that cannot be received as a reception signal by the light receiving unit 50 due to the perforated mirror 20, that is, a loss ratio R at which a portion of the received light flux is lost due to the perforated mirror 20, is expressed by Expression (35) below.

[Math. 35]

$$R = \frac{H^2}{\left(\frac{r8b'}{|\beta'|}\right)^2} \tag{35}$$

When the variable power optical system 60 is not provided as described in the seventh embodiment with reference to FIG. 14, the light flux diameter r8a' of the light flux entering the perforated mirror 20 from the driven mirror 30 is equal to the effective diameter of the driven mirror 30, namely, the effective diameter r8b' of the light flux.

When the light flux diameter of the parallel light flux emitted from the light source forming unit 10 is r8a, and the light flux diameter of the parallel light flux passing through the perforated mirror 20 and then entering the driven mirror 30 is r8b, r8a equals r8b.

In this case, the proportion of the amount of light that cannot be received as a reception signal by the light receiving unit 50 due to the perforated mirror 20, that is, a loss ratio R' at which a portion of the received light flux is lost due to the perforated mirror 20, is expressed by Expression (36) below.

[Math. 36]

$$R' = \frac{H^2}{r8b'^2} \tag{36}$$

Therefore, from Expression (35) and Expression (36), the ratio of the loss ratios R and R' is expressed by Expression (37) below.

[Math. 37]

$$\frac{R}{R'} = \frac{\frac{H^2}{\left(\frac{r8b'}{|\beta'|}\right)^2}}{\frac{H^2}{r8b'^2}} = (\beta')^2 \tag{37}$$

Thus, the inclusion of the variable power optical system 60 enables the detecting apparatus 8 according to the eighth embodiment to reduce the proportion of the amount of light that cannot be received as a reception signal by the light receiving unit 50 due to the perforated mirror 20, that is, the loss ratio of a received light flux due to the perforated mirror 20, by (β')² times.

In the detecting apparatus 8 according to the eighth embodiment, the angle of view $\theta_{SMC}'$ at which a light flux enters the perforated mirror 20 from the variable power optical system 60 while the driven mirror is still is expressed by Expression (38) below with the use of the angle $\theta_{SMC}$ at which a light flux from an object enters a surface of the driven mirror 30 while the driven mirror 30 is still and the optical magnification β' of the variable power optical system 60.

[Math. 38]

$$\theta_{SMC}' = \theta_{SMC} \times \beta' \tag{38}$$

The optical magnification β' of the variable power optical system 60 is less than 1, and $\theta_{SMC}'$ is accordingly smaller than $\theta_{SMC}$. This means that the incident image height of a received light flux on the light collection surface of the light collecting optical system 51 (i.e., on the light receiving surface 52D) from the maximum angle of view is decreased with the provision of the variable power optical system 60.

Therefore, the presence of the variable power optical system 60 requires the focal length $f_c$ of the light collecting optical system 51 to be lengthened.

However, in the detecting apparatus 8 according to the eighth embodiment, the length of a light path from the perforated mirror 20 to the light receiving surface 52D of the light receiving element 52 can be shortened because of the re-imaging optical system 56 provided between the light collecting optical system 51 and the light receiving element 52.

The detecting apparatus 8 accordingly has another effect in that an increase in the size of the apparatus resulting from the presence of the variable power optical system 60 is prevented by providing the re-imaging optical system 56.

In the detecting apparatus 8 according to the eighth embodiment, the collimator 12 converts a divergent light flux emitted from the light source 11 in the light source forming unit 10 into a parallel light flux having the light flux diameter r8a, which is smaller than the opening diameter H of the perforated mirror 20. However, the detecting apparatus 8 is not limited thereto, and a stop may be provided between the light source forming unit 10 and the perforated mirror 20.

The light source forming unit 10, which is made up solely of the light source 11 and the collimator 12 in the detecting apparatus 8 according to the eighth embodiment, is not limited thereto. When the angle of divergence from the light source 11 is asymmetric, a cylindrical lens or the like may be provided in the light source forming unit 10 to shape a divergent light flux emitted from the light source 11, and subsequently adjust the light flux diameter with the provided stop.

What is important here is to keep the light amount of an illumination light flux from the detecting apparatus at or below an upper limit determined in consideration of safety to the human eyes, and the effective diameter of the illumination light flux may be determined in the light source forming unit 10 with the use of a stop.

As described above, according to the detecting apparatus 8 of the eighth embodiment, the efficiency of light reception at the perforated mirror 20 can be improved and much of reflected and scattered light fluxes from an illuminated distant object can be taken in with the provision of the variable power optical system 60 between the perforated mirror 20 and the driven mirror 30. In addition, with the provision of the re-imaging optical system 56 between the viewing field stop 55 and the light receiving element 52, a received light flux can be received with efficiency irrespective of the location of the light receiving surface 52D of the light receiving element 52, and an increase in the size of the apparatus can be prevented as well. The reception of unnecessary light can also be prevented by decentering or tilting the light receiving element 52 or the re-imaging optical system 56 so that the center position of the light receiving surface 52D of the light receiving element 52 or the optical axis of the re-imaging optical system 56 does not fall on the optical axis of the detecting apparatus 8 (in other words, the light path of a principal ray of a light flux at the center angle of view in the range of scanning angle of views of the driven mirror 30).

This concludes descriptions on the detecting apparatus according to the embodiments. However, the present invention is not limited to the embodiments, and various changes and modifications can be made thereto.

As described above, the driven mirror and the telescope are arranged so that the center angle of view in the drive range of the driven mirror does not fall on the optical axis of the telescope in the detecting apparatus according to the embodiments of the present invention. Specifically, out of reflected and scattered fluxes from optical elements that are included in the telescope, frequently generated reflected and scattered light fluxes around the optical axis can be kept off from the center of the light receiving surface by tilting the driven mirror.

The telescope, too, is decentered in a direction perpendicular to the optical axis so that an incident point at which an illumination light flux enters the driven mirror is off the optical axis of the telescope, thereby dispersing a reflected light flux from the optical elements that are included in the telescope in diverse directions, and dispersing (blurring) unnecessary light that enters the light receiving unit.

This enables the detecting apparatus to disperse intense unnecessary light near the optical axis of the telescope, or shift an angle of view at which the unnecessary light is generated from the center of the light receiving surface and, by choosing an appropriate angle of view, the reception of unnecessary light can be prevented in a range of angle of views required for the detection and measurement of a reflected light flux from an object.

By arranging the telescope, tilting the driven mirror, and decentering the telescope in this manner, the reception of unnecessary light can be prevented while receiving much of reflected and scattered light fluxes from an object. A detecting apparatus capable of fine detection of a distant object can be obtained as a result.

The detecting apparatus according to the embodiments of the present invention are applicable particularly as a detecting apparatus for distant ranging to automated machines and sensors for automated driving as described below.

<On-Board System>

Figure 18:
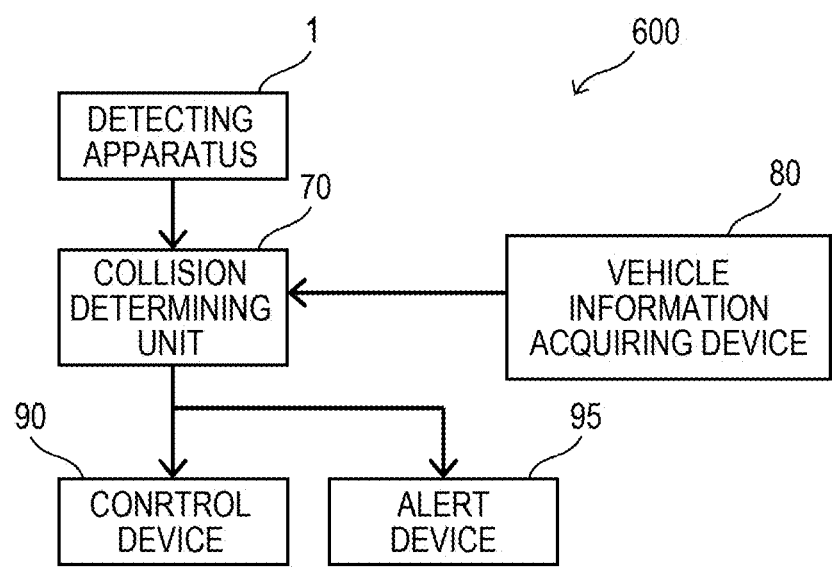
FIG. 18 is a functional block diagram of an on-board system according to the embodiments.

FIG. 18 is a diagram of the configuration of an on-board system (driving assistance apparatus) 600, which includes the detecting apparatus 1 according to one of the first to eighth embodiments described above.

The on-board system 600 is an apparatus installed in an automobile or other type of vehicle to assist in the driving of the vehicle based on image information obtained by the detecting apparatus 1 about the surroundings of the vehicle.

The on-board system 600 includes, as illustrated in FIG. 18, the detecting apparatus 1 according to one of the first to eighth embodiments described above, a collision determining unit 70, a vehicle information acquiring device 80, a control device (Electronic Control Unit: ECU) 90, and an alert device 95.

Figure 19:
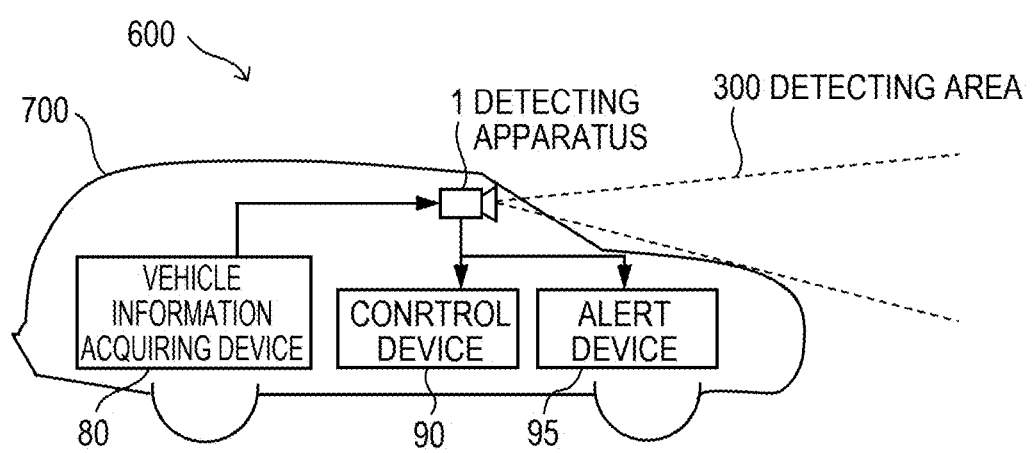
FIG. 19 is a schematic diagram of a main part in a vehicle of the embodiments.

FIG. 19 is a schematic diagram of a vehicle 700, which includes the on-board system 600.

A case in which a detection range 300 of the detecting apparatus 1 is set to a space in front of the vehicle 700 is illustrated in FIG. 19. The detection range 300 may be set to a space at the back of the vehicle 700.

The detecting apparatus 1 installed inside the vehicle 700 in FIG. 19 may be installed on the outside of the vehicle 700.

Figure 20:
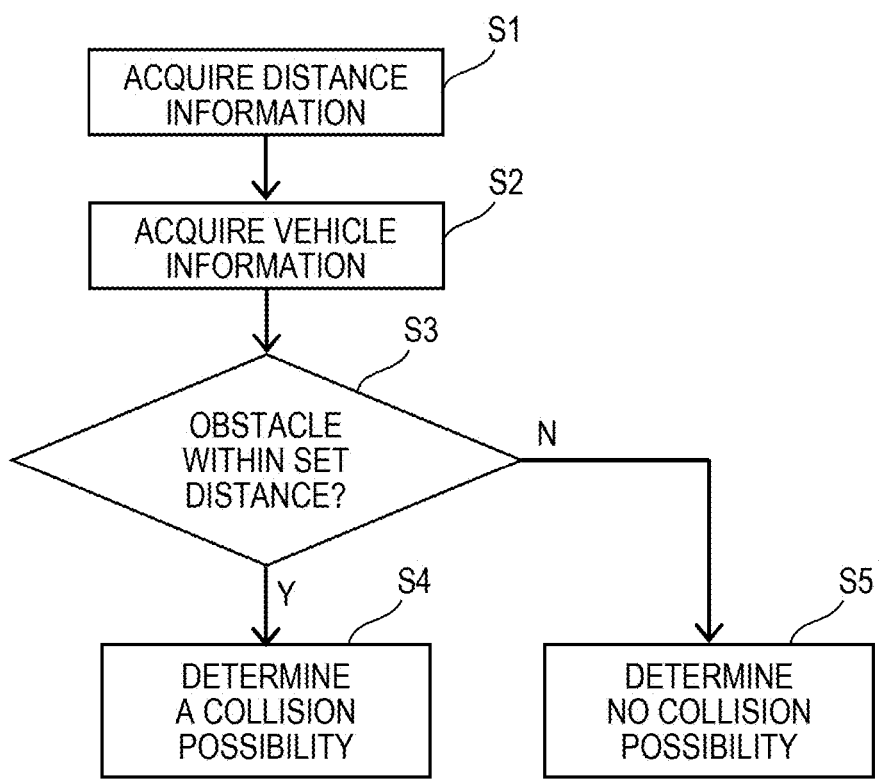
FIG. 20 is a flow chart for illustrating an example of the operation of the on-board system according to the embodiments.

FIG. 20 is a flow chart for illustrating an example of the operation of the on-board system 600 according to an embodiment of the present invention.

The operation of the on-board system 600 is described below by following the flow chart.

In Step S1, an object (subject) in the surroundings of the vehicle is detected with the use of the detecting apparatus 1, and information about the distance to the object (distance information) is acquired.

In Step S2, vehicle information is acquired from the vehicle information acquiring device 80. The vehicle information is information including the vehicle's speed, yaw rate, steering angle, and the like.

In Step S3, the collision determining unit 70 determines whether the distance information acquired by the detecting apparatus 1 indicates a distance that is contained in a set distance range set in advance. In this manner, the collision determining unit 70 determines whether an obstacle is present in the surroundings within a set distance from the vehicle to determine the possibility of a collision between the vehicle and the obstacle.

When an obstacle is present within the set distance ("yes" in Step S3), the collision determining unit 70 determines that there is a possibility of collision (Step S4). When no obstacle is present within the set distance ("no" in Step S3), the collision determining unit 70 determines that there is no possibility of collision (Step S5).

Next, when determining that there is a possibility of collision, the collision determining unit 70 notifies the result of the determination to the control device 90 and the alert device 95. At this time, the control device 90 controls the vehicle based on the result of the determination made by the collision determining unit 70, and the alert device 95 issues an alert based on the result of the determination made by the collision determining unit 70.

For example, the control device 90 performs, on the vehicle, control such as braking, ceasing acceleration, or suppressing the output of an engine or a motor by creating a control signal for generating a braking power in each wheel.

The alert device 95 issues an alert to a user (driver) of the vehicle by, for example, sounding an alert sound (an alarm), such as a sound, displaying alert information on the screen of a car navigation system or the like, or vibrating the seat belt or the steering wheel.

According to the on-board system 600 of this embodiment, an obstacle can be detected effectively through the processing described above, and a collision between the vehicle and the obstacle can accordingly be avoided. Obstacle detection and collision determination can be conducted with high precision particularly by applying the detecting apparatus according to the embodiments described above to the on-board system 600.

The on-board system 600, which is applied to driving assistance (collision damage reduction) in this embodiment, is not limited thereto, and may be applied to cruise control (including Adaptive Cruise Control), automated driving, and the like. The on-board system 600 is also not limited to automobiles and similar vehicles, and is applicable to mobile objects (mobile apparatus), for example, a ship, an airplane, or an industrial robot. The on-board system 600 is also not limited to the detecting apparatus 1 according to the embodiments of the present invention and mobile objects, and is applicable to various types of equipment that uses object recognition, for example, an intelligent transport system (ITS).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-001405, filed Jan. 9, 2018, which is hereby incorporated by reference herein in its entirety.

REFERENCE SIGNS LIST

1 detecting apparatus
11 light source
20 illumination light-received light splitting unit (splitting unit)
30 driven mirror (deflection unit)
40 telescope (first telescope)
52 light receiving element
200 object

The invention claimed is:

1. An optical apparatus comprising:
   a deflection unit configured to deflect an illumination light flux from a light source to scan an object, and configured to deflect a reflected light flux from the object;
   a guiding unit configured to guide the illumination light flux from the light source toward the deflection unit, and configured to guide the reflected light flux from the deflection unit toward a light receiving element; and
   a first optical system configured to guide the illumination light flux from the deflection unit toward the object, and configured to guide the reflected light flux from the object toward the deflection unit,
   wherein the deflection unit is arranged so that an optical path of a principal ray of the illumination light flux at a center angle of view in a scanning range of the deflection unit is constantly prevented from coinciding with an optical axis of the first optical system.

2. An optical apparatus according to claim 1, wherein the deflection unit has a deflection surface on which an incident point of the illumination light flux and the optical axis are spaced apart from each other.

3. An optical apparatus according to claim 1, wherein only a second optical system is arranged in an optical path between the guiding unit and the deflection unit, the second optical system transmitting the illumination light flux from the light source and the reflected light flux from the object.

4. An optical apparatus according to claim 1, wherein the illumination light flux from the guiding unit is incident on the deflection unit via no member.

5. An optical apparatus according to claim 1, further comprising an optical element configured to convert the illumination light flux from the light source into a parallel light flux.

6. An optical apparatus according to claim 1, further comprising a second optical system configured to decrease a diameter of the illumination light flux from the light source, and configured to increase a diameter of the reflected light flux from the deflection unit.

7. An optical apparatus according to claim 1, further comprising:
   a first imaging optical system configured to collect the reflected light flux from the deflection unit; and
   a stop configured to limit the diameter of the reflected light flux from the first imaging optical system.

8. An optical apparatus according to claim 7, further comprising a second imaging optical system configured to collect the reflected light flux from the stop on the light receiving element.

9. An optical apparatus according to claim 8, wherein the second imaging optical system is arranged so that an optical axis of the second imaging optical system and an optical axis of the optical apparatus are prevented from coinciding with each other.

10. An optical apparatus according to claim 1, wherein the light receiving element is arranged so that a center position of a light receiving surface and an optical axis of the optical apparatus are prevented from coinciding with each other.

11. An optical apparatus according to claim 1, wherein the guiding unit includes an element configured to transmit and reflect a light flux.

12. An optical apparatus according to claim 11, wherein the guiding unit is configured to allow the illumination light flux from the light source to travel toward the deflection unit, and is configured to reflect the reflected light flux from the deflection unit toward the light receiving element.

13. An optical apparatus according to claim 1, wherein the first optical system includes a plurality of optical elements each having a refractive power, and has no refractive power as a whole system.

14. An optical apparatus according to claim 1, further comprising a control unit configured to acquire information on a distance of the object based on an output of the light receiving element.

15. An on-board system comprising:
   the optical apparatus of claim 1; and
   a determining unit configured to determine a possibility of a collision between a mobile apparatus and the object based on information on a distance of the object, which is acquired by the optical apparatus.

16. An on-board system according to claim 15, further comprising a control device configured to output a control signal for generating a braking power in each wheel of the mobile apparatus when it is determined that there is a possibility of a collision between the mobile apparatus and the object.

17. An on-board system according to claim 15, further comprising an alert device configured to issue an alert to a driver of the mobile apparatus when it is determined that there is a possibility of a collision between the mobile apparatus and the object.

18. A mobile apparatus comprising an optical apparatus, wherein the optical apparatus includes:
- a deflection unit configured to deflect an illumination light flux from a light source to scan an object, and configured to deflect a reflected light flux from the object;
- a guiding unit configured to guide the illumination light flux from the light source toward the deflection unit, and configured to guide the reflected light flux from the deflection unit toward a light receiving element; and
- a first optical system configured to guide the illumination light flux from the deflection unit toward the object, and configured to guide the reflected light flux from the object toward the deflection unit,
- wherein the deflection unit is arranged so that an optical path of a principal ray of the illumination light flux at a center angle of view in a scanning range of the deflection unit is constantly prevented from coinciding with an optical axis of the first optical system, and wherein the mobile apparatus is movable while holding the optical apparatus.

19. An optical apparatus according to claim 1, wherein the first optical system is configured to increase a diameter of the illumination light flux from the deflection unit, and is configured to decrease a diameter of the reflected light flux from the object.

20. An optical apparatus comprising:
- a deflection unit configured to deflect an illumination light flux from a light source to scan an object, and configured to deflect a reflected light flux from the object;
- a guiding unit configured to guide the illumination light flux from the light source toward the deflection unit, and configured to guide the reflected light flux from the deflection unit toward a light receiving element;
- a first optical system configured to guide the illumination light flux from the deflection unit toward the object, and configured to guide the reflected light flux from the object toward the deflection unit;
- a first imaging optical system configured to collect the reflected light flux from the deflection unit; and
- a stop configured to limit the diameter of the reflected light flux from the first imaging optical system,
- wherein the deflection unit is arranged so that an optical path of a principal ray of the illumination light flux at a center angle of view in a scanning range of the deflection unit is prevented from coinciding with an optical axis of the first optical system.

\* \* \* \* \*